(12) United States Patent
Olander et al.

(10) Patent No.: US 11,775,755 B2
(45) Date of Patent: Oct. 3, 2023

(54) PROCESSING AND VISUALIZATION OF TEXTUAL DATA BASED ON SYNTACTIC DEPENDENCY TREES AND SENTIMENT SCORING

(71) Applicant: TLDR LLC, New York, NY (US)

(72) Inventors: Benjamin Olander, Berkeley, CA (US); Jedediah Carty, Albuquerque, NM (US); Matthew Van Dusen, New York, NY (US); Philip Stockton, Newport, RI (US)

(73) Assignee: TLDR LLC, New York, NY (US)

( * ) Notice: Subject to any disclaimer, the term of this patent is extended or adjusted under 35 U.S.C. 154(b) by 0 days.

(21) Appl. No.: 18/177,711

(22) Filed: Mar. 2, 2023

(65) Prior Publication Data

US 2023/0281384 A1 Sep. 7, 2023

Related U.S. Application Data

(60) Provisional application No. 63/316,361, filed on Mar. 3, 2022.

(51) Int. Cl.
*G06F 17/00* (2019.01)
*G06F 40/211* (2020.01)
(Continued)

(52) U.S. Cl.
CPC ......... *G06F 40/211* (2020.01); *G06F 16/338* (2019.01); *G06F 40/30* (2020.01)

(58) Field of Classification Search
None
See application file for complete search history.

(56) References Cited

U.S. PATENT DOCUMENTS 8,244,730 B2 *  8/2012  Gupta ............... G06F 40/20
                                          707/742
8,738,359 B2 *  5/2014  Gupta ............... G06F 40/30
                                          704/10

(Continued)

FOREIGN PATENT DOCUMENTS

CN        113111653 A       7/2021
WO    WO-2017015231 A1 *   1/2017   ......... G06F 17/271

OTHER PUBLICATIONS

C.J. Hutto, Vader—Sentiment—Analysis, Date of access—Apr. 13, 2023, Available from Internet <URL: https://github.com/cjhutto/vaderSentiment>.

(Continued)

*Primary Examiner* — Satwant K Singh
(74) *Attorney, Agent, or Firm* — Gallium Law; Wesley Schwie, Esq.; Isabel Fox

(57) ABSTRACT

Described herein are improved systems and methods for overcoming technical problems associated with processing and visualization of textual data and natural language processing. In some examples, a method is provided for determining sentiment associated with big data analysis of database information. In some examples, textual news data (e.g., NEWS API, RSS, etc.) is received via a communications network from a plurality of data platforms. The textual news data is parsed, and syntactic dependency trees are generated therefrom. A sentiment score is derived for the parsed textual data corresponding to a word or phrase associated with the textual data, and an image is generated reflecting scored sentiment for the parsed textual data.

20 Claims, 26 Drawing Sheets

(51) Int. Cl.
  *G06F 16/338*   (2019.01)
  *G06F 40/30*    (2020.01)

(56) References Cited

U.S. PATENT DOCUMENTS

| | | | |
|---|---|---|---|
| 9,772,996 B2* | 9/2017 | Sheafer | G06F 40/30 |
| 10,796,217 B2* | 10/2020 | Wu | G06Q 10/1053 |
| 2011/0004483 A1 | 1/2011 | Ting et al. | |
| 2017/0017635 A1* | 1/2017 | Leliwa | G06F 40/258 |
| 2017/0109787 A1 | 4/2017 | Kumar et al. | |
| 2018/0150739 A1 | 5/2018 | Wu | |
| 2020/0036659 A1 | 1/2020 | Wu | |
| 2021/0256541 A1* | 8/2021 | L'Huillier | G06Q 30/0201 |

OTHER PUBLICATIONS

Spacy, Industrial—Strength Natural Language Processing in Python, Date of access—Apr. 13, 2023, Available from Internet <URL: https://spacy.io/>.

C.J. Hutto, Vader: A Parsimonious Rule-base Model for Sentiment Analysis of Social Media Text, Date of access—Apr. 13, 2023, Available from Internet <URL: https://pypi.org/project/vaderSentiment/#description>.

\* cited by examiner

800 iteratively changing, by the computing system, the constructed message of method 700 to produce a new message
802 determining a corresponding sentiment score for the new message until a target sentiment score is reached, by repeating step 714
804

900 receiving, by a computing system, a first query input (wherein the first query input comprises text, and wherein the text comprises a first string)
902 retrieving, by the computing system, a second string associated or linked with the first string
904 conducting, by the computing system, tokenization analysis on the second string to identify, based on the tokenization analysis, a minimum excerpt of the second string that contains discernable sentiment
(e.g., the second string is an e-chunk)
906 storing, by the computing system, the query input, the first string, the second string, and the minimum excerpt in a database to be used to analyze another query input
908

PROCESSING AND VISUALIZATION OF TEXTUAL DATA BASED ON SYNTACTIC DEPENDENCY TREES AND SENTIMENT SCORING

CROSS-REFERENCE TO RELATED APPLICATIONS

The present application claims the benefit of priority from U.S. Provisional Patent Application No. 63/316,361 filed on Mar. 3, 2022, and entitled NATURAL LANGUAGE PROGRAM PRODUCT BASED ON SENTIMENT EXTRACTION, the entire disclosure of which application is hereby incorporated herein by reference.

TECHNICAL FIELD

The present disclosure relates to processing and visualization of textual data and natural language processing.

BACKGROUND

The processing of textual data and natural language processing (NLP) may have started with the work of Alan Turing in the 1950s. Alan Turing is often associated with the Turing test, a test of a machine's ability to exhibit intelligent behavior equivalent to a human. The test includes the evaluation of natural language conversations between a human and a machine designed to generate human-like responses. For the machine to perform such a function, NLP became necessary and a child of the information age. Currently, NLP is an evolving technology related to artificial intelligence (AI), and the research and development of NLP fall within the greater disciplines of computer science and computer engineering.

SUMMARY

Described herein are improved systems and methods for overcoming technical problems associated with the processing and visualizing textual data and natural language processing. In some examples, a method is provided for determining sentiment associated with big data analysis of database information. In some examples, textual news data (e.g., NEWS API, RSS, etc.) is received via a communications network from a plurality of data platforms. The textual news data is parsed, and syntactic dependency trees are generated therefrom. A sentiment score is derived for the parsed textual data corresponding to a word or phrase associated with the textual data, and an image is generated reflecting scored sentiment for the parsed textual data.

Although many of the examples described herein pertain to the processing and visualization of textual news data, it is to be understood that the techniques described herein can be applied to any type of textual data, and the disclosure is not limited to news data use cases.

In summary, the systems and methods (or techniques) disclosed herein can provide specific technical solutions to at least overcome the technical problems mentioned in the application and other technical problems not described herein but recognized by those skilled in the art.

With respect to some embodiments, disclosed herein are computerized methods for processing and visualization of textual data, natural language processing, and a non-transitory computer-readable storage medium for carrying out technical operations of the computerized methods. The non-transitory computer-readable storage medium has tangibly stored thereon, or tangibly encoded thereon, computer-readable instructions that, when executed by one or more devices (e.g., one or more personal computers or servers), cause at least one processor to perform a method for a novel and improved processing and visualization of textual data as well as natural language processing.

With respect to some embodiments, a system is provided that includes at least one computing device configured to provide useful and novel processing and visualization of textual data as well as natural language processing. And with respect to some embodiments, a method is provided to be performed by at least one computing device. In some example embodiments, computer program code can be executed by at least one processor of one or more computing devices to implement functionality in accordance with at least some embodiments described herein, and the computer program code being at least a part of or stored in a non-transitory computer-readable medium.

For example, some embodiments include a method including receiving, by a computing system, textual news data via a communications network from a plurality of data sources as well as parsing, by the computing system, the received textual news data. The method also includes generating, by the computing system, a plurality of syntactic dependency trees according to the parsed textual news data. And the method includes determining, by the computing system, a sentiment score for the parsed textual news data corresponding to a word or phrase associated with the parsed textual news data according to the generated plurality of syntactic dependency trees. Also, the method includes generating, by the computing system, an image including the determined sentiment score and displaying, via a graphical user interface (GUI), the determined sentiment score. In some embodiments, the method includes statistical sampling, by the computing system, the received textual news data, and the determination of sentiment score is further based on statistical sampling of the received textual news data.

As an example alternative, some embodiments include a method including receiving, by a computing system, textual news data via a communications network from a plurality of data sources as well as constructing, by the computing system, a message including the received textual news data. The method continues with parsing, by the computing system, the constructed message, generating, by the computing system, a plurality of syntactic dependency trees according to the parsed message, and determining, by the computing system, a sentiment score for the parsed message corresponding to a word or phrase associated with the parsed message according to the generated plurality of syntactic dependency trees. Also, the method includes generating, by the computing system, an image including the determined sentiment score and displaying, via a GUI, the determined sentiment score.

These and other important aspects of the invention are described more fully in the detailed description below. The invention is not limited to the particular assemblies, apparatuses, methods, and systems described herein. Other embodiments can be used, and changes to the described embodiments can be made without departing from the scope of the claims that follow the detailed description.

BRIEF DESCRIPTION OF THE DRAWINGS

The present disclosure will be understood more fully from the detailed description given below and from the accompanying drawings of various embodiments of the disclosure.

Embodiments of the invention will now be described, by way of example, with reference to the accompanying drawings listed in this Brief Description of the Drawings.

FIGS. 3 to 9 illustrate example methods, in accordance with some embodiments of the present disclosure.

FIG. 17 illustrates a chart showing the functional process of the NLP according to this disclosure, in accordance with some embodiments of the present disclosure.

DETAILED DESCRIPTION

Described herein are improved systems and methods for overcoming technical problems associated with processing and visualization of textual data and natural language processing. In some examples, a method is provided for determining sentiment associated with big data analysis of database information. In some examples, textual news data (e.g., NEWS API, RSS, etc.) is received via a communications network from a plurality of data platforms. The textual news data is parsed, and syntactic dependency trees are generated therefrom. A sentiment score is derived for the parsed textual data corresponding to a word or phrase associated with the textual data, and an image is generated reflecting scored sentiment for the parsed textual data. Although many of the examples described herein pertain to the processing and visualization of textual news data, it is to be understood that the techniques described herein can be applied to any type of textual data, and the disclosure is not limited to news data use cases.

With respect to some embodiments disclosed herein, this application pertains to textual media content based on examination and analysis of a corpus of literature using machine learning to provide a basis for determining sentiment, over time, with the purpose of identifying and possibly changing media narratives, e.g., graphical representations of trends.

It has been theorized that a correlation exists between sentiment and contemporaneously published literature and articles. Hundreds of thousands of written works or more can be analyzed via AI described herein, and the repeated input of such works can improve the AI through machine learning. The AI can determine article sentiment over time, as gleaned from contemporary media, along with the discovery of narrative trends, demonstrable on a coordinate axis, reflective of positive and negative sentiment as registered by valence and arousal associated with words or groups of words. In some embodiments, the words or groups of words are e-chunks, each being an individual word or a group of words found in a body of text that correlates to a distinct unit of sentiment.

Figure 1:
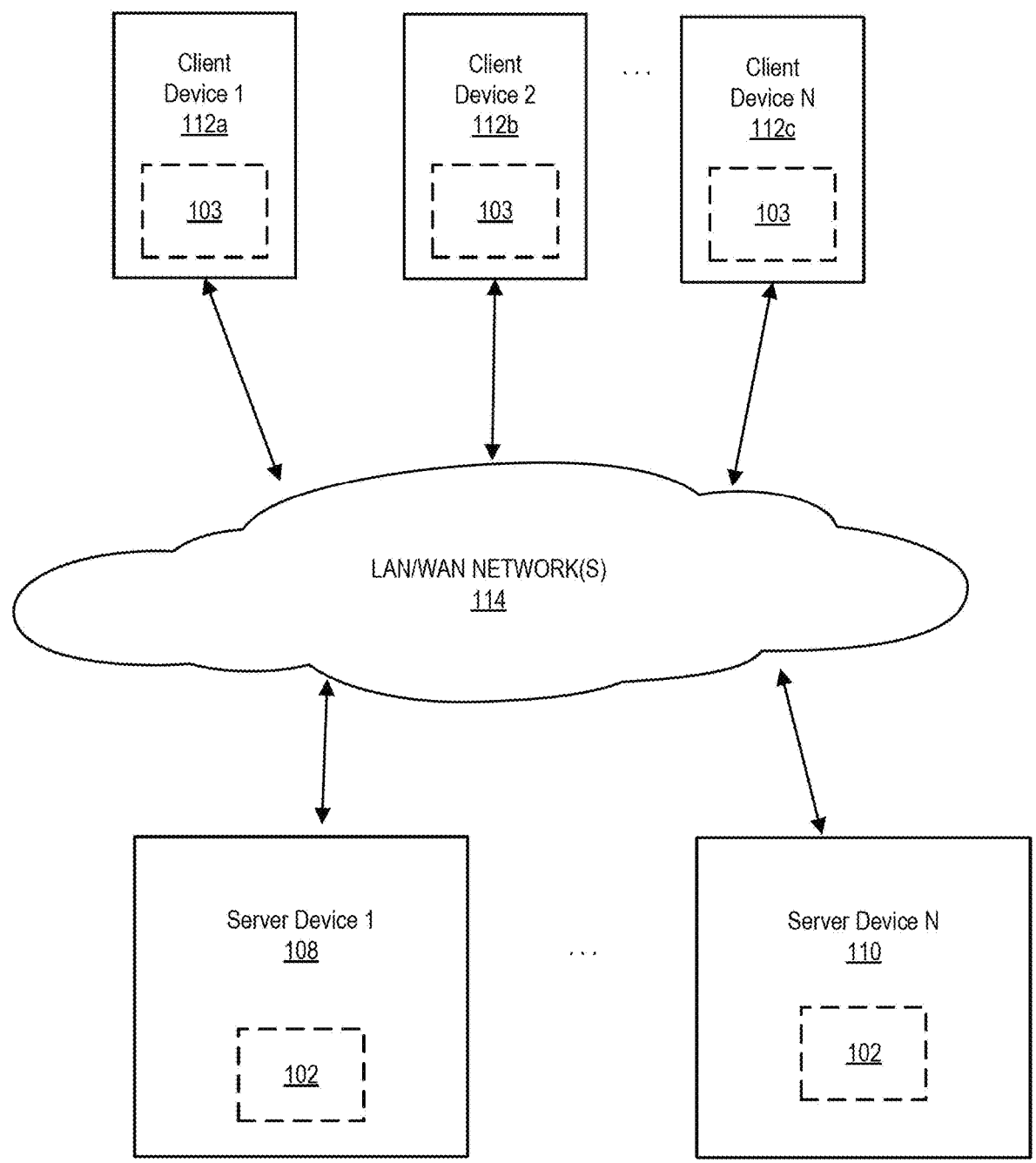
FIG. 1 illustrates an example network of computing systems to implement technologies for the systems and methods described herein, as well as foreseeable derivatives thereof, in accordance with some embodiments of the present disclosure.

FIG. 1 illustrates an example network of computing system 100 to implement technologies for the systems and methods described herein, as well as foreseeable derivatives thereof, in accordance with some embodiments of the present disclosure. For example, the network of computing system 100 can implement any of the aforesaid and proceeding components and operations described herein. The network of computing system 100 is shown, including a backend computing component 102 and a frontend computing component 103. As shown in FIG. 1, the backend computing component 102 can be hosted on server computers (e.g., see server devices 108 and 110). Also, as shown in FIG. 1, the frontend computing component can be hosted on client computers (e.g., see client devices 112a, 112b, and 112c). The network of computing system 100 is also shown, including one or more LAN/WAN networks 114 which are shown communicatively coupling the server computers and the client computers. The LAN/WAN network(s) 114 can include one or more local area networks (LAN(s)) and/or one or more wide area networks (WAN(s)). The LAN/WAN network(s) 114 can include the Internet and/or any other interconnected communications network. The LAN/WAN network(s) 114 can also include a single computer network or a telecommunications network. More specifically, the LAN/WAN network(s) 114 can include a local area network (LAN) such as a private computer network that connects computers in small physical areas, a wide area network (WAN) to connect computers located in different geographical locations, and/or a metropolitan area network (MAN)—also known as a middle area network—to connect computers in a geographic area larger than that covered by a large LAN but smaller than the area covered by a WAN.

At least each shown component of the network of computing system 100 can be or include a computing system which can include memory that can include media. The media can include or be volatile memory components, non-volatile memory components, or a combination of such. In general, each of the computing systems can include a host system that uses the memory. For example, the host system can write data to the memory and read data from the memory. The host system can be a computing device such as a desktop computer, laptop computer, network server, mobile device, or such computing device that includes a memory and a processing device. The host system can include or be coupled to the memory so that the host system can read data from or write data to the memory. The host system can be coupled to the memory via a physical host interface. The physical host interface can provide an interface for passing control, address, data, and other signals between the memory and the host system.

Figure 2:
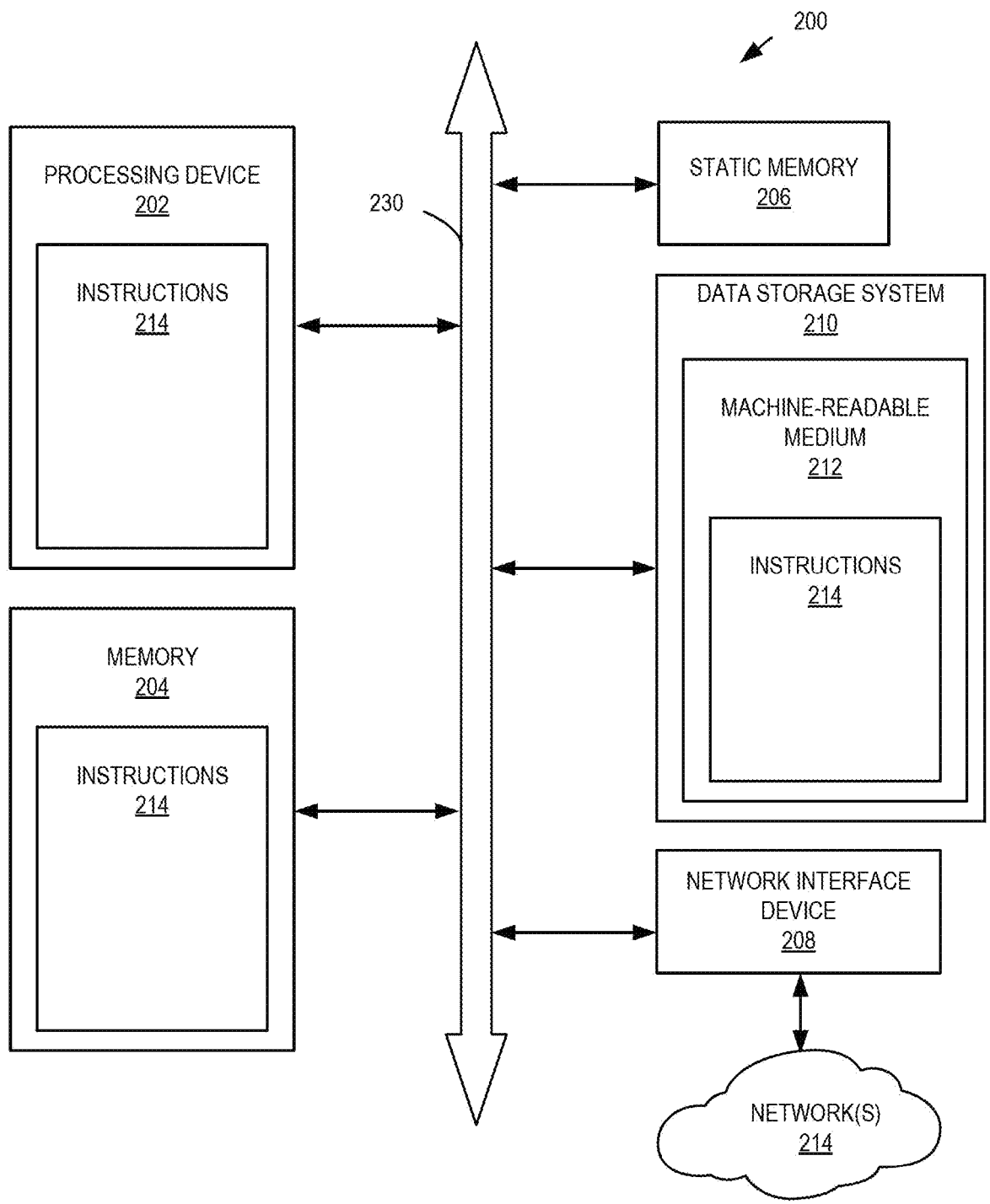
FIG. 2 is a block diagram of example aspects of an example computing system, in accordance with some embodiments of the present disclosure.

FIG. 2 is a block diagram of example aspects of an example computing system 200, in accordance with some embodiments of the present disclosure. FIG. 2 illustrates parts of the computing system 200 within which a set of instructions for causing the machine to perform any of the methodologies discussed herein can be executed. In some embodiments, the computing system 200 can correspond to a host system that includes, is coupled to, or utilizes memory or can be used to perform the operations of a controller (e.g., to execute an operating system to perform operations corresponding to the backend computing component 102 or the frontend computing component 103). In alternative embodiments, the machine can be connected (e.g., networked) to other machines in a LAN, an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computing system 200 includes a processing device 202, a main memory 204 (e.g., read-only memory (ROM), flash memory, dynamic random-access memory (DRAM), etc.), a static memory 1206 (e.g., flash memory, static random-access memory (SRAM), etc.), and a data storage system 210, which communicate with each other via a bus 230.

The processing device 202 represents one or more general-purpose processing devices such as a microprocessor, a central processing unit, or the like. More particularly, the processing device can be a microprocessor or a processor implementing other instruction sets or a combination of instruction sets. The processing device 202 can also be one or more special-purpose processing devices such as an application specific integrated circuit (ASIC), a field programmable gate array (FPGA), a digital signal processor (DSP), a network processor, or the like. The processing device 202 is configured to execute instructions 214 for performing the operations discussed herein. The computing system 200 can further include a network interface device 208 to communicate over the LAN/WAN network(s) 114 of FIG. 1.

The data storage system 210 can include a machine-readable storage medium 212 (also known as a computer-readable medium) on which is stored one or more sets of instructions 214 or software embodying any one or more of the methodologies or functions described herein. The instructions 214 can also reside, completely or at least partially, within the main memory 204 and/or within the processing device 202 during execution thereof by the computing system 200, the main memory 204, and the processing device 202, also constituting machine-readable storage media.

In one embodiment, the instructions 214 include instructions to implement functionality corresponding to the backend computing component 102 or the frontend computing component 103. While the machine-readable storage medium 212 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that causes the machine to perform any one or more of the methodologies of the present disclosure. The term "machine-readable storage medium" shall accordingly be taken to include, but not be limited to, solid-state memories, optical media, and magnetic media.

FIGS. 3 to 9 illustrate example operations of the computing systems described herein (e.g., see computing system 200), in accordance with some embodiments of the present disclosure. FIGS. 3 to 9 illustrate methods 300 to 900, respectively.

The method 300 commences, at step 302, with receiving, by a computing system, textual news data via a communications network from a plurality of data sources. At step 304, the method 300 includes parsing, by the computing system, the received textual news data (e.g., the data parsed by the backend computing component 102 shown in FIG. 1). At step 306, the method 300 includes generating, by the computing system, a plurality of syntactic dependency trees according to the parsed textual news data (e.g., the trees generated by the backend computing component 102). Also, the method 300, at step 314, includes determining, by the computing system, a sentiment score for the parsed textual news data corresponding to a word or phrase associated with the parsed textual news data according to the generated plurality of syntactic dependency trees (e.g., the score determined by the backend computing component 102). In some embodiments, including embodiments of the method 300, the parsed data, a part of the parsed data, the corresponding word, or the corresponding phrase is or includes an e-chunk or becomes an e-chunk after an iteration of the method.

At step 316, the method 300 includes generating, by the computing system, an image including the determined sentiment score (such as the frontend computing component 103 shown in FIG. 1 generating the image). And at step 318, the method 300 includes displaying, via a GUI (such as a GUI rendered by the frontend computing component 103), the determined sentiment score.

Figure 3:
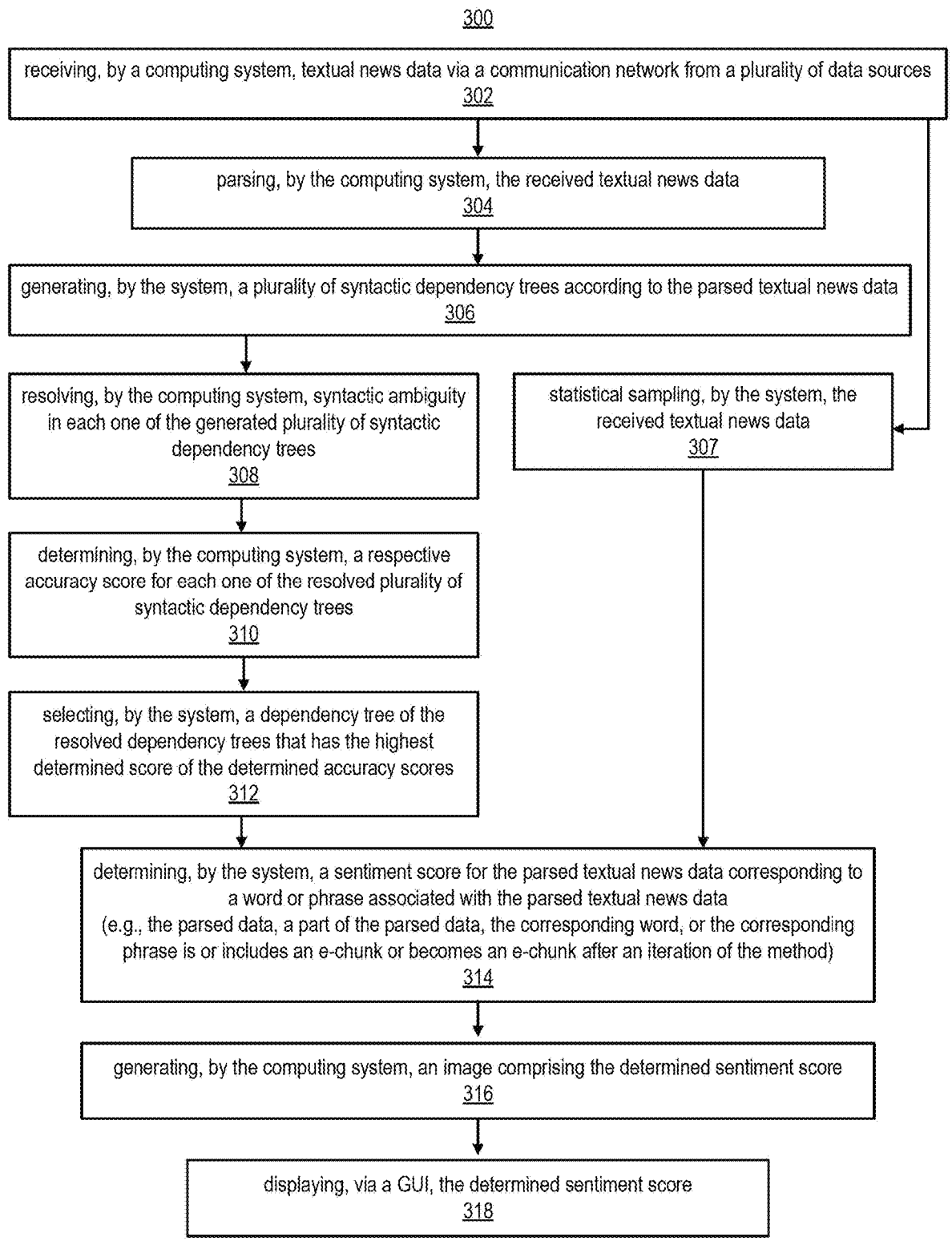

As shown in FIG. 3, the method 300 also includes, at step 307, statistical sampling, by the computing system, the received textual news data (e.g., the sampling being performed by the backend computing component 102). And the determination of the sentiment score, at step 314, is further based on statistical sampling of the received textual news data.

Further, as shown in FIG. 3, the method 300 includes, at step 308, resolving, by the computing system, syntactic ambiguity in each one of the generated plurality of syntactic dependency trees prior to determining the sentiment score (e.g., the ambiguity resolved by the backend computing component 102). And the determination of the sentiment score is based on the resolved plurality of syntactic dependency trees.

Also, as shown in FIG. 3, the method 300 includes determining, by the computing system, a respective accuracy score for each one of the resolved plurality of syntactic dependency trees (at step 310). In some examples, the determination of the scores is by the backend computing component 102. The assigning an accuracy score to a syntactic dependency tree of the resolved plurality of syntactic dependency trees is based on an estimation of accuracy in resolving syntactic ambiguity in the syntactic dependency tree. As shown, the assignment of the respective accuracy scores occurs prior to determining the sentiment score, and the determination of the sentiment score is further based on the determined accuracy scores for each one of the resolved plurality of syntactic dependency trees.

Further, as shown in FIG. 3, the method 300 includes selecting, by the computing system, a dependency tree of the resolved plurality of syntactic dependency trees that has the highest determined accuracy score of the determined accuracy scores (at step 312). In some embodiments, such a selection is performed by the backend computing component 102. And the determining the sentiment score according to the selected syntactic dependency tree having the highest determined accuracy score.

Figure 4:
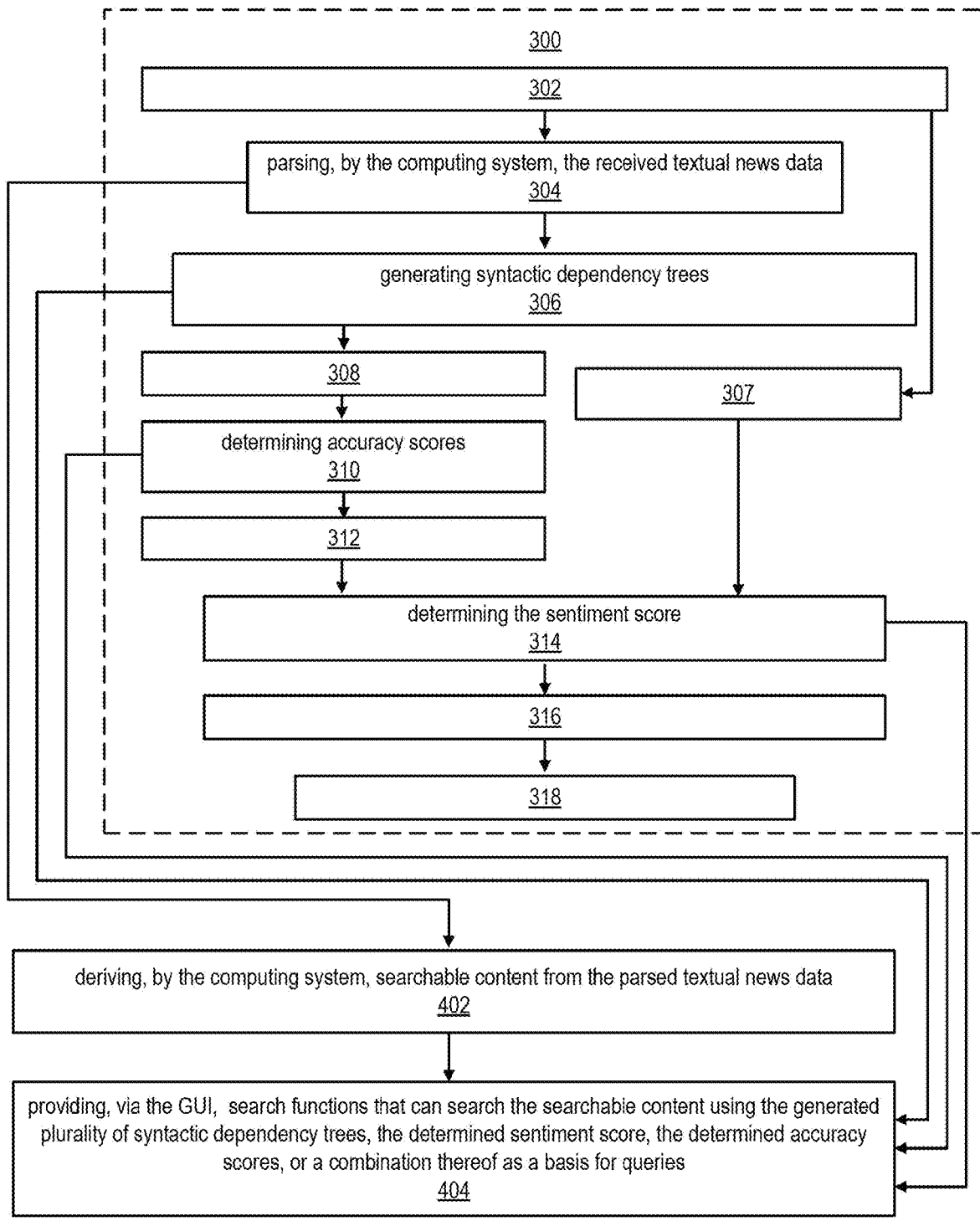

In some embodiments, such as shown by method 400 of FIG. 4, the method 300 is part of an application framework and a greater method. In such embodiments, the application framework provides searchable content to be searched via the GUI. As shown in FIG. 4, the method 400 includes all the steps of method 300 and further includes deriving, by the computing system, the searchable content from the parsed textual news data (at step 402). Also, in such examples, the method 400 further includes providing, via the GUI, search functions that can search the searchable content using the generated plurality of syntactic dependency trees, the determined sentiment score, the determined accuracy scores, or a combination thereof as a basis for queries (at step 404).

In some embodiments of method 400, the search functions are part of a user search and audit tool interface provided by the GUI, and the search functions further include queries that are definable by a user identifier, a date, positive sentiment, negative sentiment, news attribution, or any combination thereof.

In some embodiments of method 300 or 400 or other methods described herein, the plurality of data sources includes application programming interfaces (e.g., NEWS API), really simple syndication (RSS) feeds, social media platforms, news aggregators, social news aggregators (e.g., REDDIT), or any combination thereof.

Figure 5:
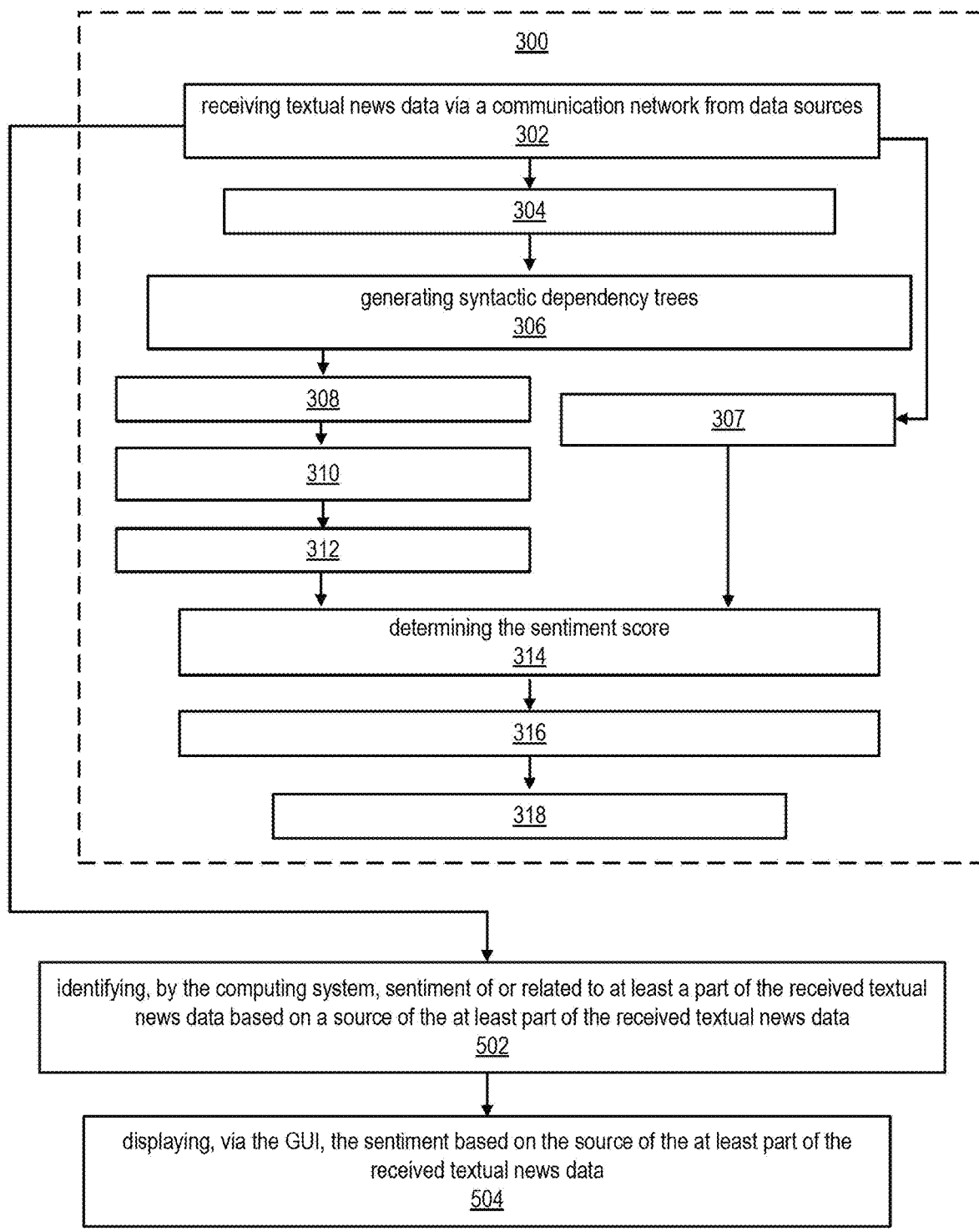

In some embodiments, such as shown in FIG. 5, the method 300 is part of a greater method, such as method 500. Method 500 includes identifying, by the computing system, the sentiment of or related to at least a part of the received textual news data based on a source of the at least part of the received textual news data (at step 502). Method 500 also includes displaying, via the GUI, the sentiment based on the source of the at least part of the received textual news data (at step 504).

Figure 6:
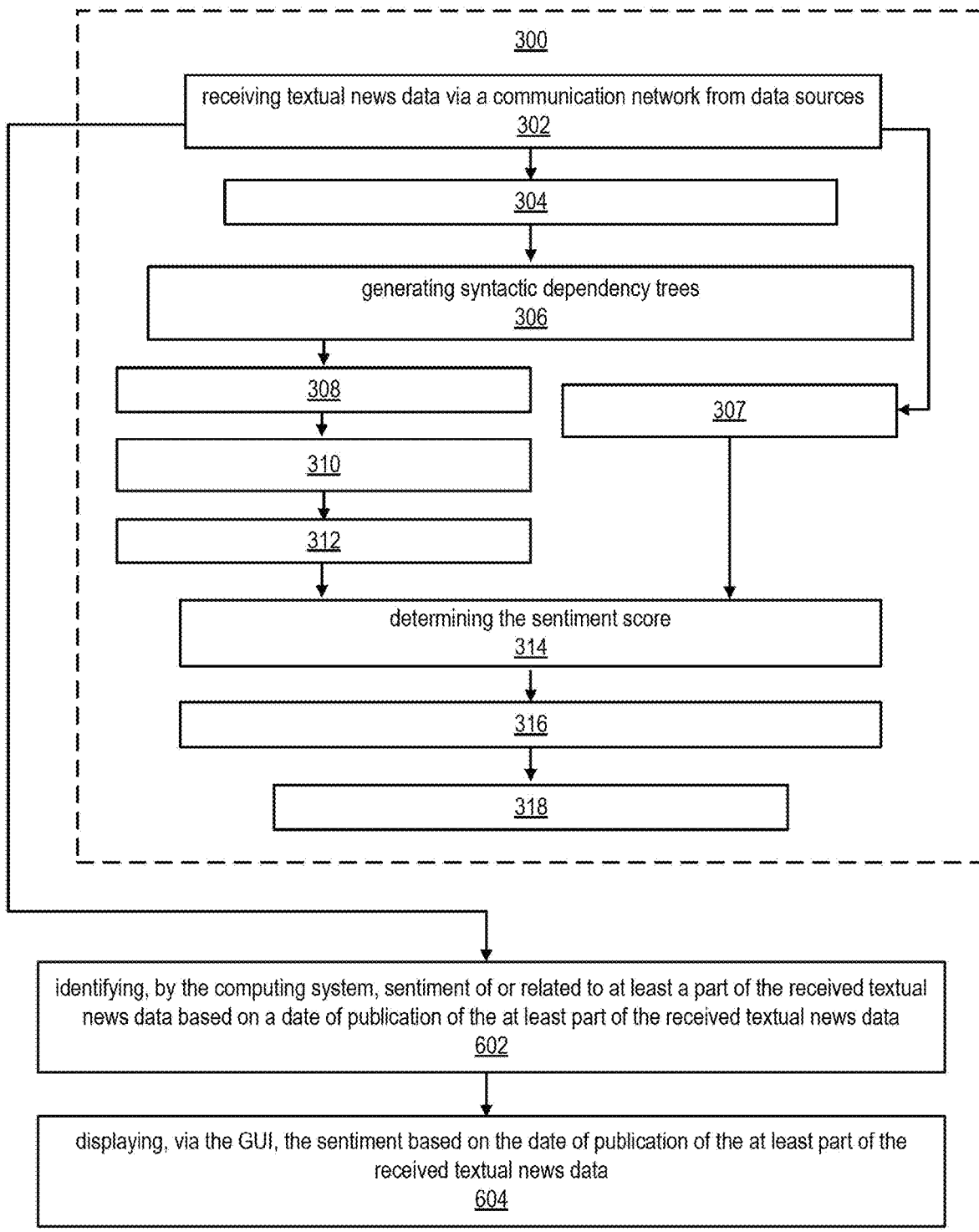

In some embodiments, such as shown in FIG. 6, the method 300 is part of a greater method, such as method 600. Method 600 includes identifying, by the computing system, the sentiment of or related to at least a part of the received textual news data based on a publication date of the at least part of the received textual news data (at step 602). Method 600 also includes displaying, via the GUI, the sentiment based on the publication date of at least part of the received textual news data (at step 604).

Figure 7:
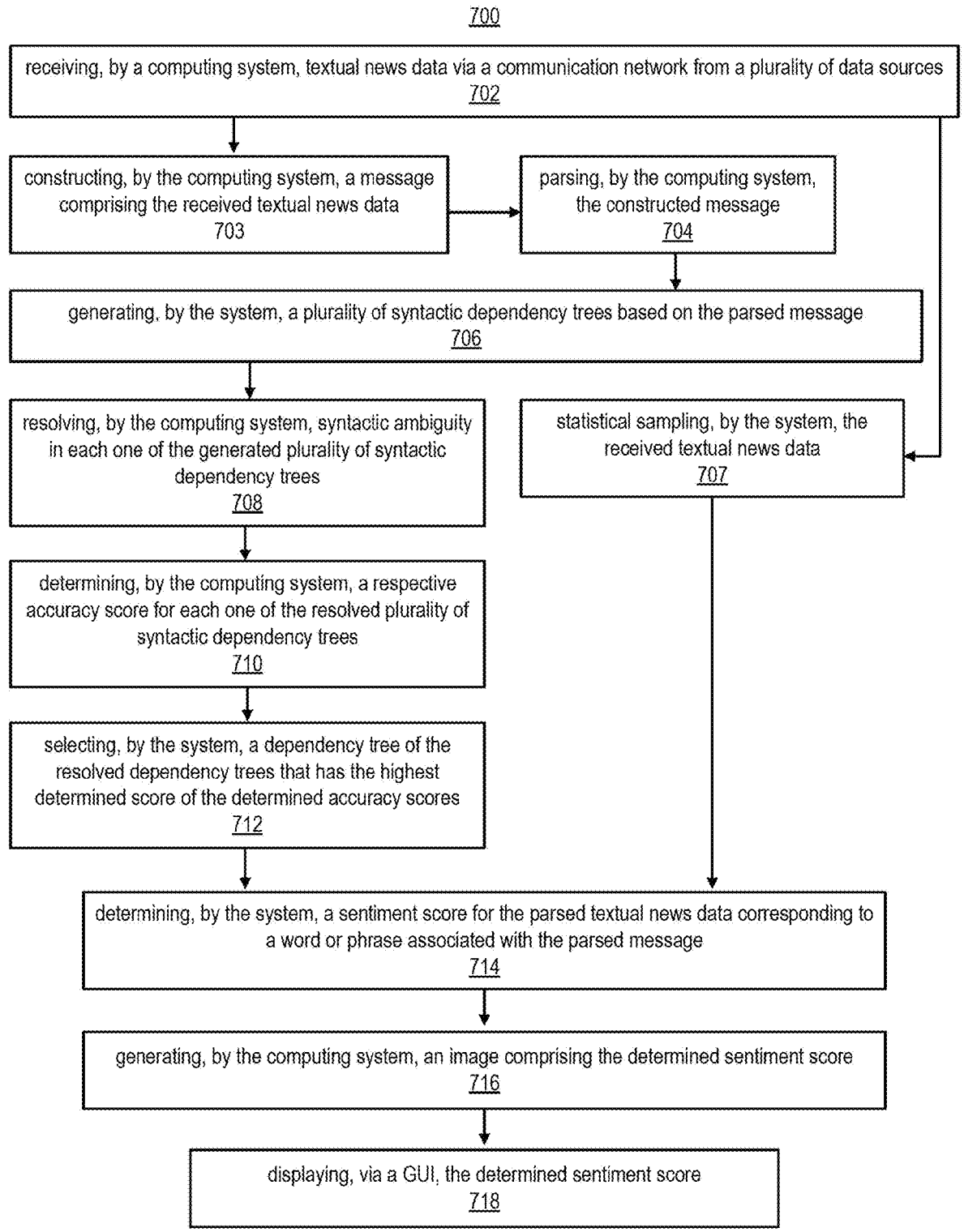

As shown in FIG. 7, the method 700 commences, at step 702, with receiving, by a computing system, textual news data via a communications network from a plurality of data sources. At step 703, the method 700 continues with constructing, by the computing system, a message including the received textual news data. At step 704, the method 700 includes parsing, by the computing system, the constructed message. At step 706, the method continues with generating, by the computing system, a plurality of syntactic dependency trees according to the parsed message. At step 707, the method includes statical sampling, by the computing system, the received textual news data.

Also, the method 700 includes, at step 714, determining, by the computing system, a sentiment score for the parsed message corresponding to a word or phrase associated with the parsed message according to the generated plurality of syntactic dependency trees. The method 700 also includes generating, by the computing system, an image including the determined sentiment score (at step 716). And the method 700 includes displaying, via a GUI (such as a GUI render by frontend computing component 103), the determined sentiment score (at step 718).

At step 708, the method 700 includes resolving, by the computing system, syntactic ambiguity in each one of the generated plurality of syntactic dependency trees prior to determining the sentiment score. And the determination of the sentiment score is based on the resolved plurality of syntactic dependency trees. Also, at step 710, the method 700 includes determining, by the computing system, a respective accuracy score for each one of the resolved plurality of syntactic dependency trees. In some such embodiments, the assigning an accuracy score to a syntactic dependency tree of the resolved plurality of syntactic dependency trees is based on an estimation of accuracy in resolving syntactic ambiguity in the syntactic dependency tree. And for example, the assignment of the respective accuracy scores occurs prior to determining the sentiment score, and the determination of the sentiment score is further based on the determined accuracy scores for each one of the resolved plurality of syntactic dependency trees. At step 712, the method 700 includes selecting a dependency tree of the resolved plurality of syntactic dependency trees that has the highest determined accuracy score of the determined accuracy scores. And the determining of the sentiment score is according to the selected syntactic dependency tree having the highest determined accuracy score.

Figure 8:

As shown in FIG. 8, the method 800 depends on method 700 and repeats step 714 (determining the sentiment score) until a determined sentiment score of a preselected value is reached. At step 802, the method 800 includes iteratively changing, by the computing system, the constructed message to produce a new message. And at step 804, the method 800 includes determining a corresponding sentiment score for the new message until a target sentiment score is reached—by repeating step 714 of method 700.

Referring back to method 700, in some examples, the method is part of an application framework; the application framework provides searchable content to be searched via the GUI, and the method further includes deriving the searchable content from the parsed message. In such examples and others, the method can further include providing, via the GUI, search functions using the generated plurality of syntactic dependency trees, the determined sentiment score, the determined accuracy scores, or a combination thereof as a basis for queries. In some examples, the search functions are part of a user search and audit tool interface provided by the GUI, and the search functions further include queries that are definable by a user identifier, a date, positive sentiment, negative sentiment, news attribution, or any combination thereof.

In some embodiments of method 700, the plurality of data sources includes application programming interfaces (e.g., NEWS API), really simple syndication (RSS) feeds, social media platforms, news aggregators, social news aggregators (e.g., REDDIT), or any combination thereof. And in some examples, the method 700 includes displaying, via the GUI, the sentiment of or related to at least a part of the received textual news data based on a source of the at least part of the textual news data. Also, the method 700 can include displaying, via the GUI, the sentiment of or related to at least a part of the received textual news data based on a date of publication of the at least part of the textual news data. In some cases, the determination of the sentiment score is further based on statistical sampling of the received textual news data.

FIG. 9 shows another alternative example, method 900 of analyzing text to determine sentiment. The method 900 commences with receiving, by a computing system, a first query input (at step 902), wherein the first query input includes text and wherein the text includes a first string. The method 900 also includes retrieving, by the computing system, a second string associated or linked with the first string (at step 904). At step 906, the method 900 continues with conducting, by the computing system, tokenization analysis on the second string to identify, based on the tokenization analysis, a minimum excerpt of the second string that contains discernable sentiment. In some embodiments, the tokenization analysis includes or occurs after normalizing a group of strings associated with and including the first and second strings. In some embodiments, the minimum excerpt is or includes an e-chunk. For the purposes of this disclosure, it is to be understood that an e-chunk is an individual word or a group of words found in a body of text that correlates to a distinct unit of sentiment.

At step 908, the method 900 continues with storing, by the computing system, the query input, the first string, the second string, and the minimum excerpt in a database to be used to analyze another query input or to analyze the query input to improve analysis of the query input iteratively. As shown, method 900 includes a repeatable loop (see arrow 910) in that the other input or the input can be, include, or be a part of the first query input of step 902. In this way, the overall method 900 can be enhanced, or its output can be enhanced with each iteration of the method. In this sense, the method includes machine learning. Also, additional machine learning techniques can be utilized to improve method 900 and at least parts of the other methods described herein.

In some examples of the method 900, the method further includes analyzing the minimum excerpt within the context of the query input to refine the discernable sentiment. In some examples of the method 900, the method further includes assigning a sentiment score to the minimum excerpt based on the refined discernable sentiment. In some examples of the method 900, the sentiment score includes a range of sentiments. In some such examples, the sentiment score includes a range from negative sentiment to positive sentiment. In some examples of the method 900, the database includes a database of contextually analyzed and sentiment-scored text. And in some examples of the method 900, the method further includes visually representing the sentiment score on a GUI. Also, the sentiment score can be provided in a GUI with sentiment scores of other strings, such as being provided in a graph format.

Figure 10:
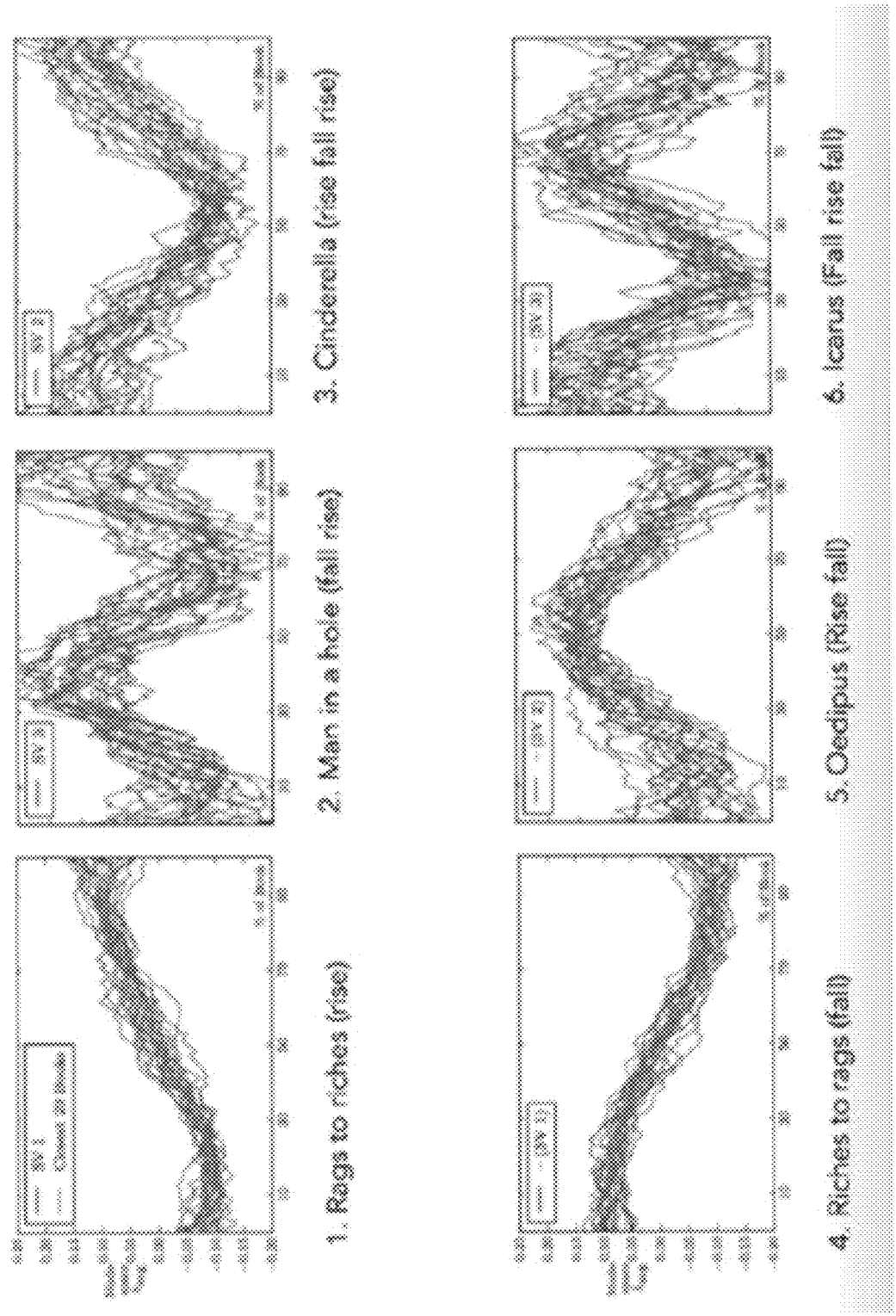
FIG. 10 is a chart showing various narrative arc examples, in accordance with some embodiments of the present disclosure.

FIG. 10 is a chart showing a variety of narrative arc examples, such as rags to riches (a rising graph); man-in-a-hole (a falling graph followed by a rising graph); Cinderella (a rising graph followed by a falling graph, followed by a rising graph); rags-to-riches (a falling graph); Oedipus (a rising graph followed by a falling graph); and Icarus (a falling graph followed by a rising graph, followed by a falling graph). Contemporary written news media was fed into an example of NLP used by some embodiments described herein to score words based on sentiment. For example, step 304 of method 300, shown in FIG. 3, can include at least a part of such NLP to parse the received textual news data prior to generating syntactic dependency trees in step 306 of the same method. Also, in some embodiments, different parts of the NLP can be used in two or more of the steps 304, 306, 307, 308, 310, 312, and 314 of method 300. Also, one or more aspects of the methods 400 to 900 can use one or more parts of the NLP. It is to be understood that the example NLP can include any know techniques for natural language processing. Also, it is understood that the methods described herein can be implemented by a system (such as any one or more of the computing systems of FIG. 1 or computing system 200 shown in FIG. 2).

In FIG. 10, the combination of valence and arousal, referred to as sentiment, of words was determined and depicted on a Cartesian coordinate graph. The Cartesian coordinate graph provides a view of negative and/or positive sentiments over time and the degree of positivity or negativity. The research sought to find how contemporary news media narratives follow predictable narrative arcs. This concept can be applied to corporate content regarding how news coverage can affect a given company. A distinct set of trends were envisioned based on the aggregate sentiment of the news. Consequently, a question to be determined was whether or not a discernible signal could be found in a given narrative (e.g., any kind of news coverage) by using an extensive data review of the news. This amounted to asking robots to read the news.

An NLP test was applied to Internet articles concerning Donald Trump and his campaign for President in 2016. The test aimed to determine what kind of signals (i.e., what kind of discernible narrative arc) could be observed concerning sentiment. Initial results contained a series of solid signals, but the discernible narrative arcs posited by Vonnegut were not observed. Nonetheless, the other signals could be sorted based on a series of variables, such as volume over time, publication writer, or the type of article. This opened up a range of possibilities. The mapping correlation presented some options for determining sentiment in the news and its correlation with various parameters such as stock price.

Consequently, using an application programming interface (API), data from datasets of several types were fed to a processor. The initial visualizations of the signals within the datasets were performed using a visual mapping process. The visual mapping process can include geocoding, in which the process can automatically transform location data and associated information into interactive visual maps, such as visual maps that can be zoomed in and out of. The mapping process can include functions that can process census-based population, income, and other standard demographic datasets and can also be used to process datasets associated with words and phrases. In the visual environment of the mapping process, users can see aspects of the data sets visually and share what is reviewed through the maps generated by the process. In some embodiments, the mapping process can occur or include TABLEAU (https://www.tableau.com/solutions/maps).

With such a mapping process or other types of data analysis, an interrogatable signal can be pulled from data noise by the system. This increased data availability, thereby allowing searches on various topics over any given time (such as searches performed by the system). The machine learning and NLP of the system can be refined by rewriting certain aspects of instructions for the system (e.g., see instructions 214 shown in FIG. 2) to improve targeting, tokenization, normalization, and other rules to determine the relationship between words, etc. The system further refined word associations with negations in sentences to assess sentiment. A narrative sentiment over time, overlaid with the stock price, proved insufficiently interrogable to produce a sentiment mapping that was strongly correlated with the stock price. However, it was found that sentiment arcs could be applied, by the system, to companies and topics, themes, and personalities, and it could be determined, by the system, the types of sentiment-laden words used in connection with publications online about such subjects. Discernible sentiment arcs were pulled, by the system, from datasets with at least some regularity dispensing with the need to rebuild data for sentiment analysis each program run. This permitted sentiment searches which provided a further basis for analysis. A platform of the system was developed to take language found on the Internet and predictively determine sentiment using a visual representation. For instance, the platform can algorithmically score the language of a sentence using the relationship between words. It was discovered that machines were increasingly the intended audience for many kinds of content found on the web, whether public relations (PR), securities filings, etc., and the knowledge of this can be used by the system.

Figure 11:
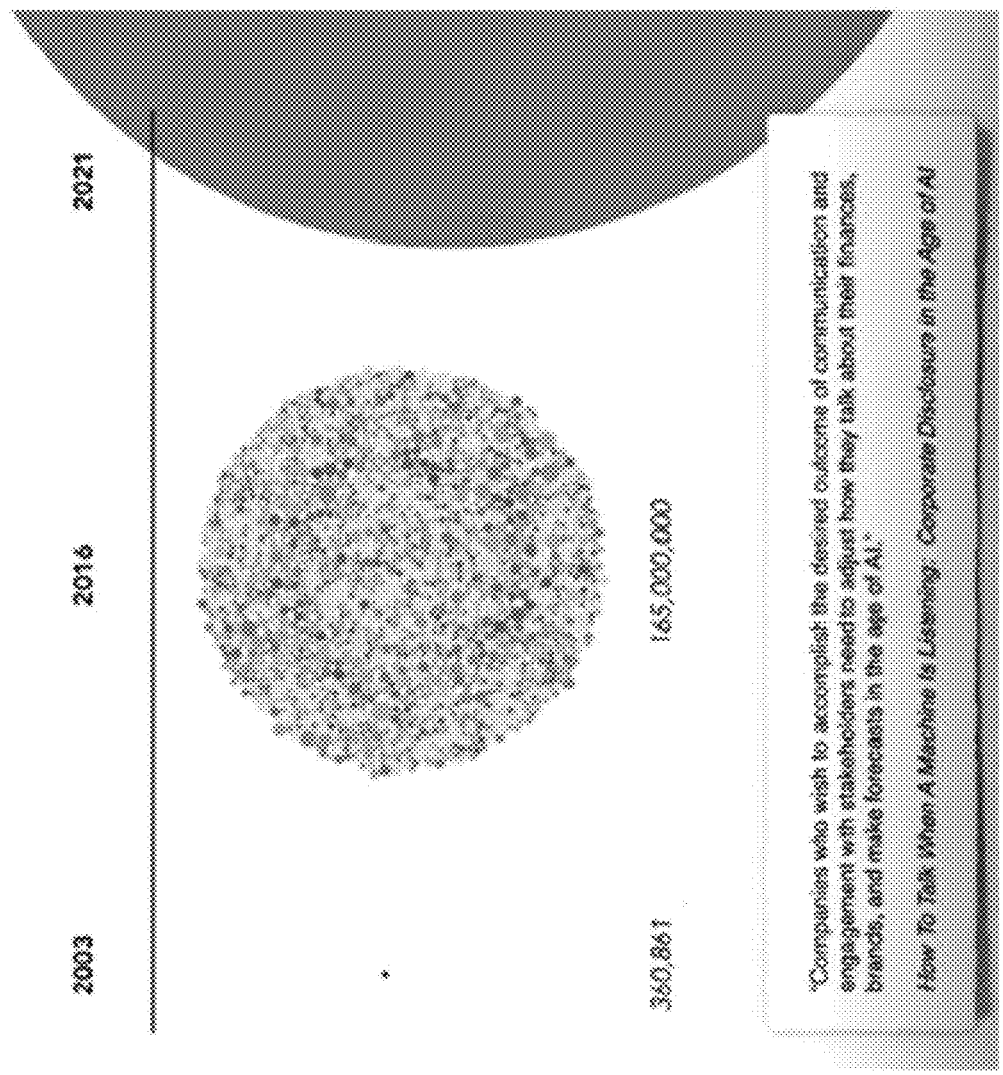
FIG. 11 illustrates a chart showing AI as an intended audience for publications, in accordance with some embodiments of the present disclosure.

FIG. 11 illustrates a chart that shows AI as an intended audience for publications. In just over a decade, machine-generated downloads of corporate 10-K and 10-Q filings have increased significantly. For instance, it was hypothesized that social media was, in fact, no longer exclusively intended for a human audience but rather, increasingly, for a robot (bot) audience to a majority extent. Much of the news received by the system is edited, sorted, and prioritized by AI in connection with using NLP in an NLP environment. Consequently, companies that wish to accomplish the desired outcome of communication and engagement with stakeholders should adjust how they talk about their finances, brands, and forecasts in the age of AI. With the application of the system to a given business, it is possible to sort information that will yield results beyond whether a given article is simply good or bad, happy or sad, or positive or negative. Specifically, a platform or program of the system can determine and assign, via its instructions, phrase sentiment values within the context of finding and sorting the frequency of words and terms being used in or for an online publication during a given period. The platform or program aims to provide the capability for a given company to understand how AI sees that company's business and brand. This includes determining how AI sorts and prioritizes business information. This capability is demonstrated by FIGS. 12 and 13, which illustrate displays produced by the NLP of a graphical representation of sentiment determined for certain words or phrases.

Figure 12:
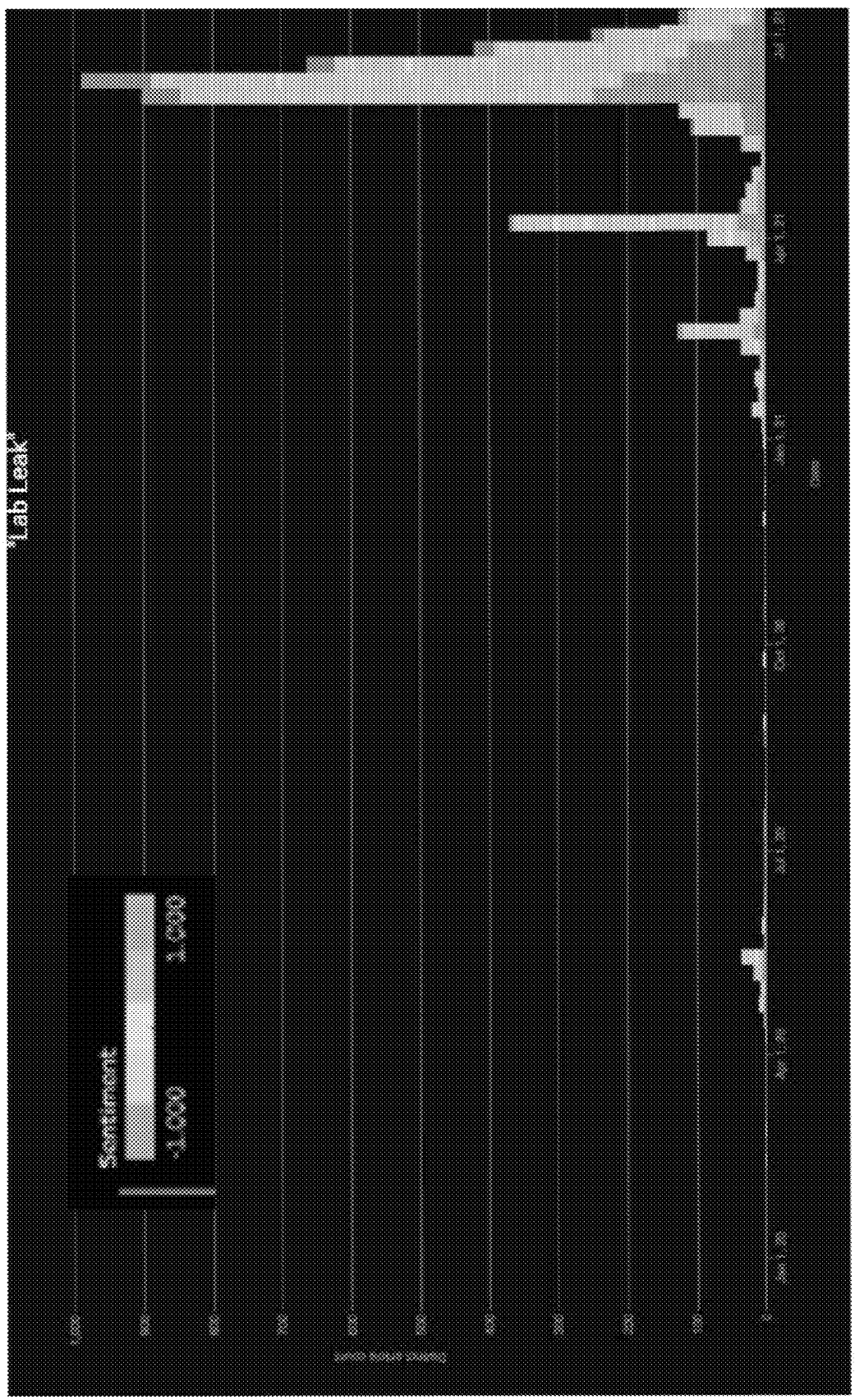
FIG. 12 illustrates a graphical representation of sentiment determined for certain words or phrases, in accordance with some embodiments of the present disclosure.
Figure 13:
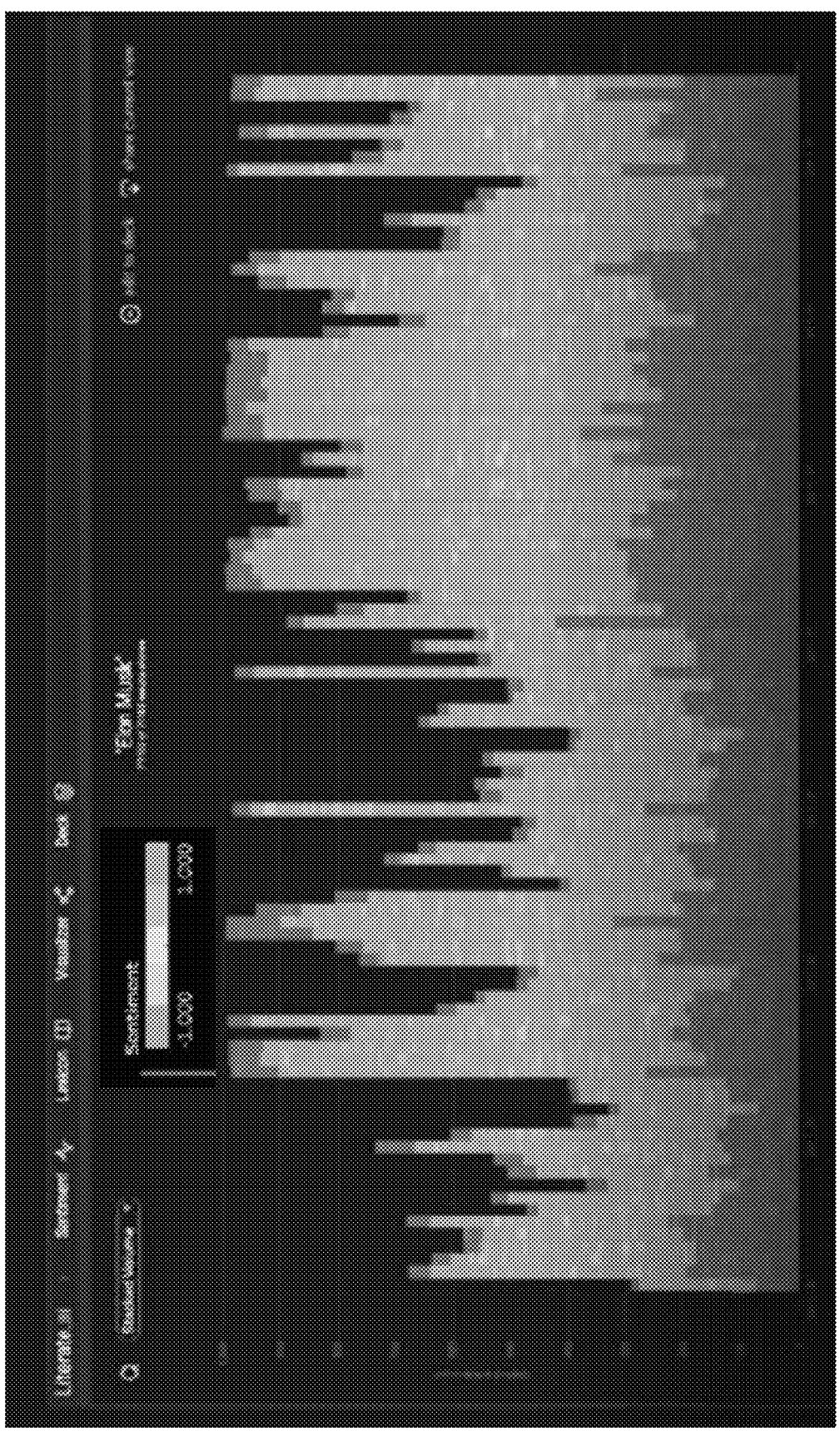
FIG. 13 illustrates another graphical representation of sentiment determined for certain words or phrases, in accordance with some embodiments of the present disclosure.

The sentiment in FIG. 12 pertains to the phrase "lab leak," a topic in the news concerning the SARS-CoV-2 coronavirus. The NLP of the system scours the news for signals (e.g., words or phrases for which detection is sought in news resources such as online publications). The frequency of use of certain detected words or phrases (such as "lab leak" as shown in FIG. 12 or Elon Musk in FIG. 13) is noted by the ordinate (y-axis) as the distinct number of articles (article count). Further, each one of the stacked bars shown in FIGS. 3 and 4 represent a news article from a publication wherein words can be sorted and colors grouped and assigned based on whether the usage of words therein is positive (green), neutral (yellow), or negative (red or reddish), representing the sentiment behind the usage of those words.

Additionally, shading the color towards a more negative sentiment using a more reddish hue allows further distinction of the sentiment of a detected word or phrase in an article. Also, a more positive sentiment can be expressed using a greener hue. The article date is indicated on the abscissa (or x-coordinate). For instance, as shown in FIG. 12, each news article containing the detected phrase "lab leak" is accounted for by a sentiment color plotted on the publication date of the news article. Each vertical bar of color shows the number of pertinent articles mentioning the phrase "lab leak," and each article is grouped by common color.

Consequently, for instance, should ten articles contain the phrase "lab leak" on a particular date, e.g., Mar. 1, 20xx, then a multi-color bar showing the number of articles of the same sentiment grouped is represented on the graph. Therefore, should ten articles reflect the detected phrase "lab leak" with two articles of positive sentiment, three articles of neutral sentiment, and five articles of negative sentiment, then a bar will be shown, on the article date, having colors reflecting the respective proportion of sentiments. For this example, that means one-fifth of the bar will be green, three-tenths of the bar will be yellow, and one-half of the bar will be red. The bars display positive, neutral, and negative articles in that order, starting from the abscissa (or the x-axis). Regarding FIG. 12, most of the negative sentiment associated with "lab leak" occurred in July 2021.

Generally, after a word or phrase is chosen as a target, a processor running the NLP searches for the chosen word or phrase among many sources over the Internet. The NLP processor then matches the phrase to the text from an Internet source. The NLP parses the one or more longer phrases or sentences in which the phrase is found. For instance, the word to be searched for can be "water." "Water," as a word without context, can be considered neutral in sentiment. However, placing the adjective "scalding" before it, as in "scalding water," will likely carry negative connotations and, therefore, negative sentiment. Likewise, the adjective "freezing" placed before "water"

also likely carries a negative implication and, hence, negative sentiment. In fact, "freezing" or "scalding" placed within four of five words of water can be regarded as having a negative connotation and, therefore, a negative sentiment. By contrast, "spa" as used with "water" or "drinking" placed before "water" can likely carry positive implications and positive sentiment. Further, "spa" or "drinking" used within four or five words of "water" can have a positive connotation and, therefore, a positive sentiment.

The NLP of the system can also match sentiment concerning a noun with its use with certain words such as "good," "bad," or "evil" appearing in a sentence or phrase nearby. Further, whether positive, negative, bad, or good, connotations can be drawn in connection with parsing textual data. After that, the NLP extracts syntactic dependency trees from that textual data. This extraction is referred to as "syntactic dependency parsing." Syntactic dependency parsing returns various dependence parse tags describing the relationship between two words in a sentence. Syntactic dependency trees are extracted to recognize a sentence and assign a syntactic structure. This is accomplished in connection with a parse tree generated by a parsing algorithm. A given sentence can generate many parse trees, commonly called "ambiguities." The NLP uses a syntactic disambiguation algorithm to select the most accurate parse tree.

Figure 14:
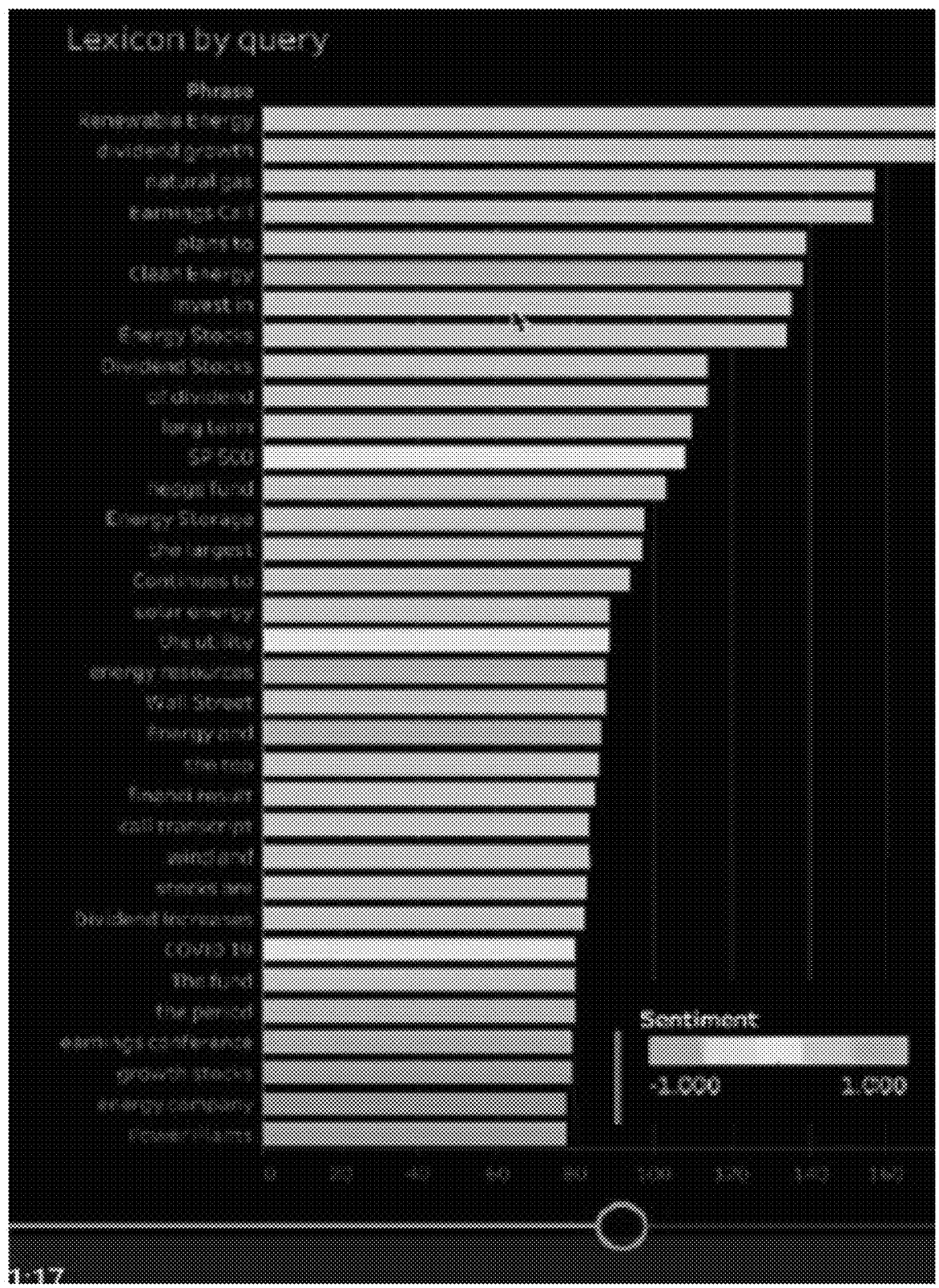
FIG. 14 illustrates a horizontal bar graph representing the sentiment of words found in news sources, in accordance with some embodiments of the present disclosure.

FIG. 14 illustrates an NLP display of the system representing another sentiment of words found in news sources portrayed on a horizontal bar graph. Specific word phrases are shown along the ordinate, and the number of times the word or phrase occurs is shown along the abscissa. For a given advertising pitch, the NLP, according to this disclosure, can score the sentiment of phrases/words under consideration for use.

Figure 15:
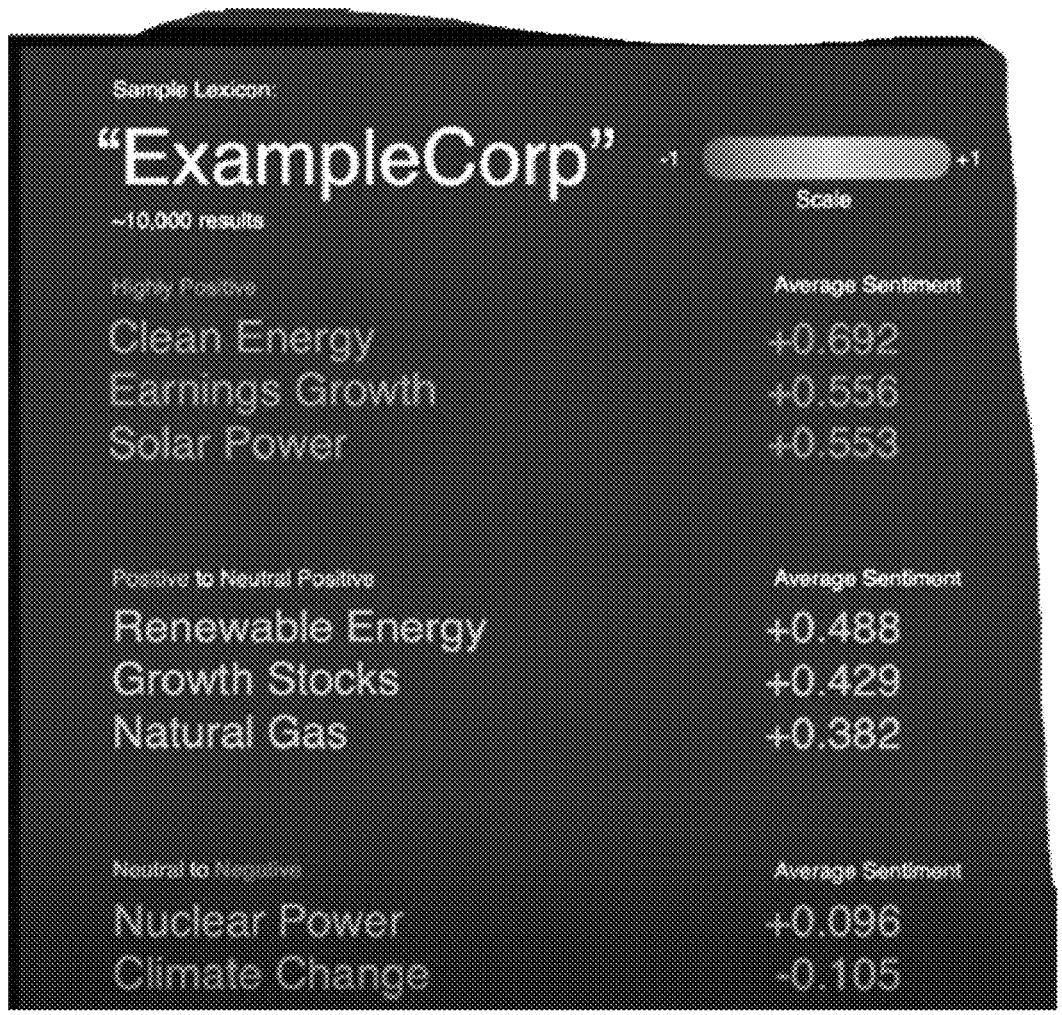
FIG. 15 illustrates a chart showing a sentiment depiction for three candidate pitches/messages under consideration for use by a fictitious green utility, in accordance with some embodiments of the present disclosure.

FIG. 15 illustrates a chart of the system showing a sentiment depiction for three candidate pitches/messages under consideration for using "ExampleCorp," a fictitious green utility with messaging concerning the benefits of its wind turbines or solar power program. The NLP helps identify words that drive positive sentiment and flags the words to be avoided. As such, a message can be proactively scored.

Figure 16:
FIG. 16 illustrates a program screen for an NLP program showing a sentiment analyzer for phrases that can be used, for instance, in a company pitch or message, in accordance with some embodiments of the present disclosure.

According to this disclosure, FIG. 16 illustrates a program display of the NLP of the system, showing a sentiment visualizer and analyzer of the system for phrases that can be used, for instance, in a company pitch or message. The sentiment visualizer and analyzer provides a syntactic mapping of phrases to identify, among other things, the linguistic structure of a phrase, thereby shedding light on the semantic role of words in a phrase. This sentiment analyzer enables interrogation of, for instance, news headlines, thereby enabling the ready determination of why the sentiment algorithm gave a particular score to words/phrases. According to this disclosure, the NLP allows the entry of a headline and diagrams (as a type of parse tree) of the relationships found therein. As such, a diagram can specify, for instance, that content functions as a noun, an adjective, a verb, or a word that modifies another word, etc. It can also allow input as to the target of a sentence and show that not all words have equal value. Some words can be shown to be sentiment-laden, while others can have relationships with one another.

The sentiment visualizer and analyzer can be used as a forward writing tool that permits content creation. Headlines can be placed in various places, along with the use of various press releases. Further, the sentiment visualizer and analyzer determines sentiment changes based on changing one word, for instance, in an advertising campaign, to another. Moreover, the sentiment visualizer and analyzer allows determination of what happens should the order of words be rearranged, or more sentiment-laden words are employed. Further, the sentiment visualizer and analyzer can provide several syntactic mappings for a phrase. In connection with the NLP running a subroutine that employs an algorithm using linguistic disambiguation to estimate the accuracy of each syntactic mapping, the syntactic mapping candidate with the highest estimation score is chosen as the correct syntactic mapping for the phrase. Such a candidate is shown in FIG. 16.

According to the disclosure herein, the NLP assigns a sentiment valuation to a chosen syntactic mapping by providing a sentiment score to a particular phrase/word as it appears in each use of the phrase/word found in the pool of data being analyzed. The display mapping, as discussed herein, results from these mappings and scoring.

Figure 17:
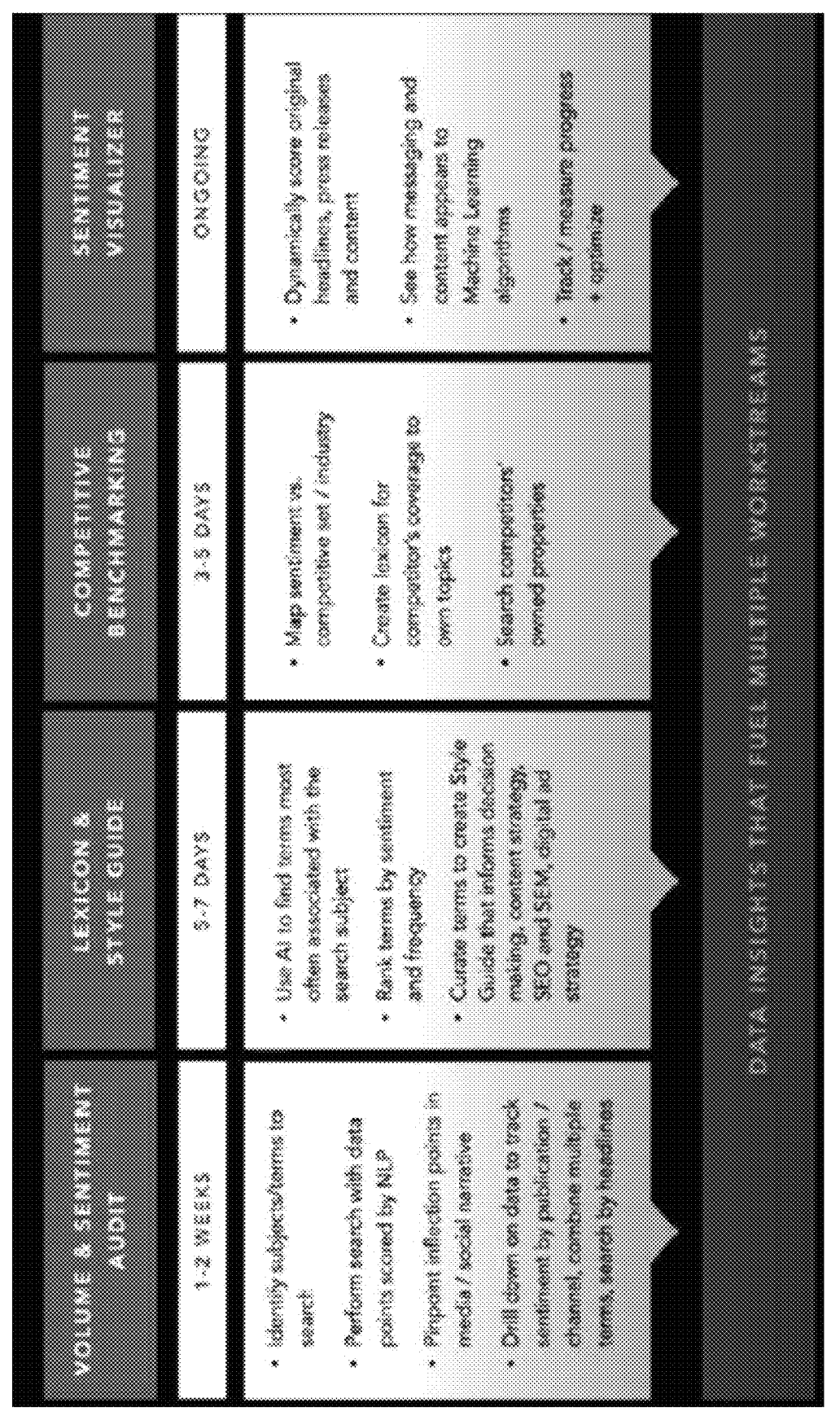

FIG. 17 illustrates a chart showing the functional process of the NLP according to this disclosure. An audit is performed, and adjacencies between companies are determined. The sentiment is examined, and a lexicon is investigated. Words can be further interrogated, which allows for determining which words work and which have associations. For a company that considers itself innovative, it can be determined whether that word (innovative) ever appears in news coverage.

Further, should "innovative" appear in the literature associated with a company, a determination can be made as to whether the associated sentiment is, for instance, extremely positive. The NLP can also determine whether competitor news articles show similar sentiments, and content can be analyzed on an ongoing basis.

Figure 18:
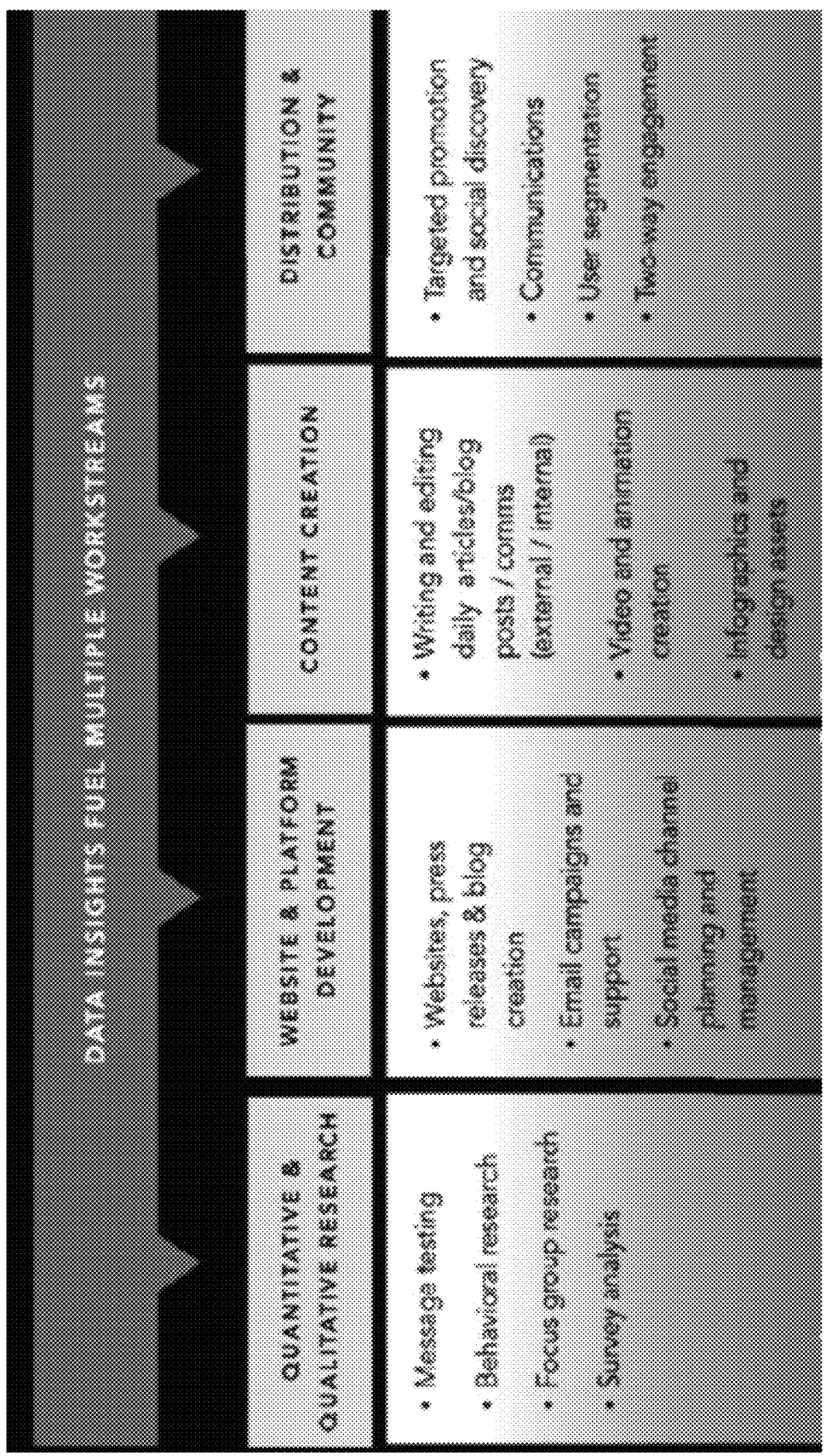
FIG. 18 illustrates a chart showing additional functional processing that can be fueled beyond that shown in FIG. 17, in accordance with some embodiments of the present disclosure.

FIG. 18 illustrates a chart showing additional functional processing of the system that can be fueled beyond the functional process illustrated in FIG. 17. This additional functional processing can include, for instance, quantitative and qualitative research, website and platform development, content creation, etc.

Figure 19:
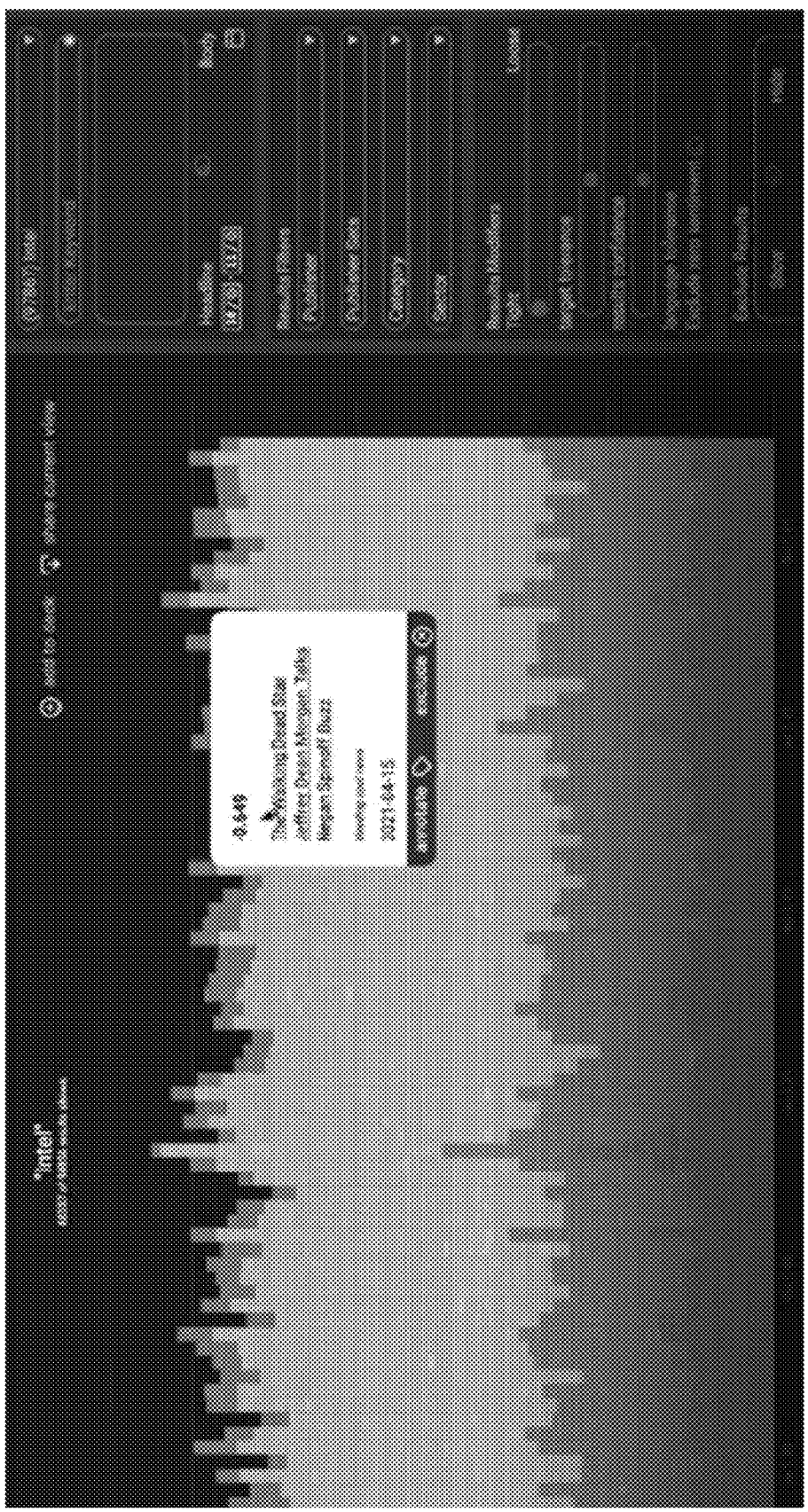
FIG. 19 illustrates a sentiment diagram showing an example of sentiment mapping concerning a data set, in accordance with some embodiments of the present disclosure.

FIG. 19 illustrates a sentiment display of the system showing an example of sentiment mapping concerning a data set for Company "Z" (Co. "Z"), a fictitious company. This mapping is formed from about 100,000 articles about Co. "Z." Each one of the bars represents a news article. The ones at the top (the most negative) are in red, and green bars represent positive articles about Co. "Z." Yellow bars represent neutral articles about Co. "Z."

Figure 20:
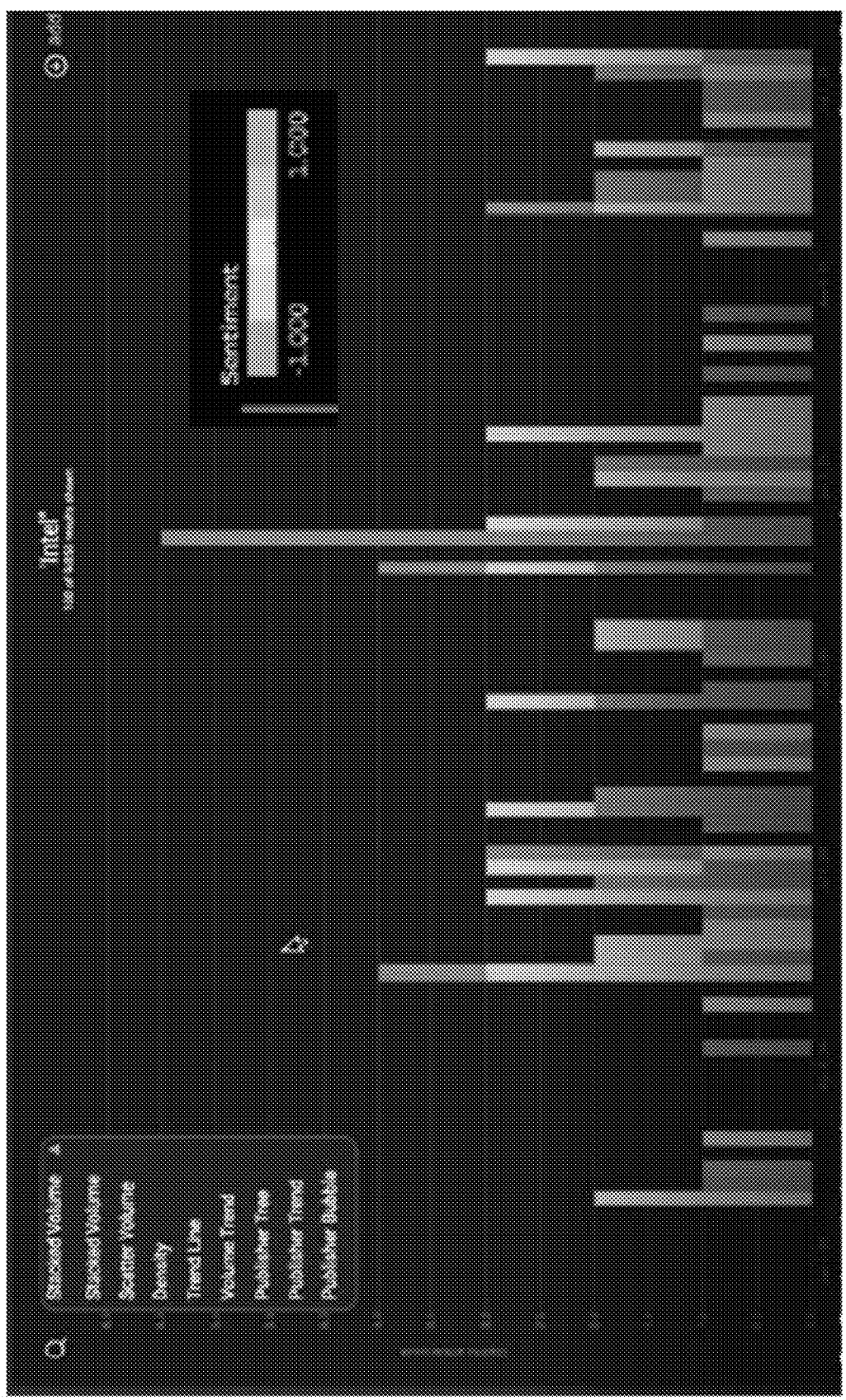
FIG. 20 is a graph showing a different aspect of the data from FIG. 10, in accordance with some embodiments of the present disclosure.

FIG. 20 shows a different aspect of the data from FIG. 19. As shown, data can be sorted in different ways, including by publisher. For instance, a determination can be made of sentiment shown in articles, from a corresponding dataset, in a news publication. According to the disclosure, the NLP permits the scoring of the sentiment of articles in, for instance, the NEW YORK TIMES. Trend lines about the coverages, positive or negative, can also be determined.

Figure 21:
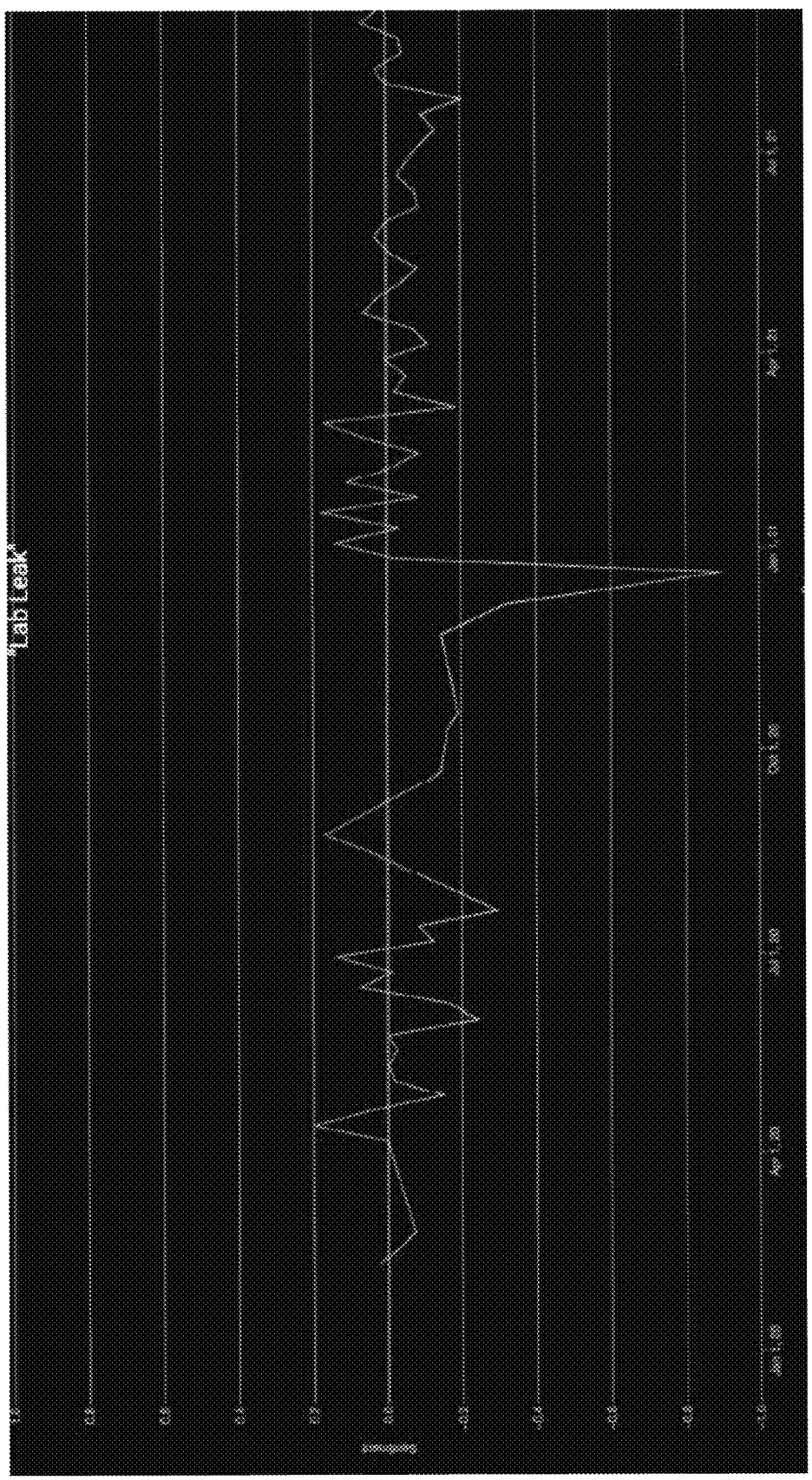
FIG. 21 shows a plot of trend lines concerning the data set used with FIGS. 10 and 11, in accordance with some embodiments of the present disclosure.

FIG. 21 shows a plot of trend lines the system provides concerning the data set used with FIGS. 3 and 4. The trend lines indicate the extent of positive or negative coverage. The sentiment is expressed on the ordinate (y-axis), over a range from +1 to −1, with neutral sentiment (0.0) occurring at the intersection of the ordinate with the abscissa (x-axis). Very positive sentiment (e.g., +1) on the graph is represented with green, while very negative sentiment (e.g., −1) is represented on the graph with red. More neutral sentiment appears in yellow on the graph. The x-axis represents time. As shown in FIG. 21, the time ranges over a period from January (Jan.) 20 (2020) through October (Oct.) 21 (2021).

Figure 22:
FIG. 22 is a chart showing data characterizations, in accordance with some embodiments of the present disclosure.

FIG. 22 is a chart the system provides, showing data characterizations; for instance, sentiment about Co. "Z" can be illustrated with a certain sentiment assigned thereto. In addition, the density of coverage of a particular company over a period of time can be displayed (not shown).

Figure 23:
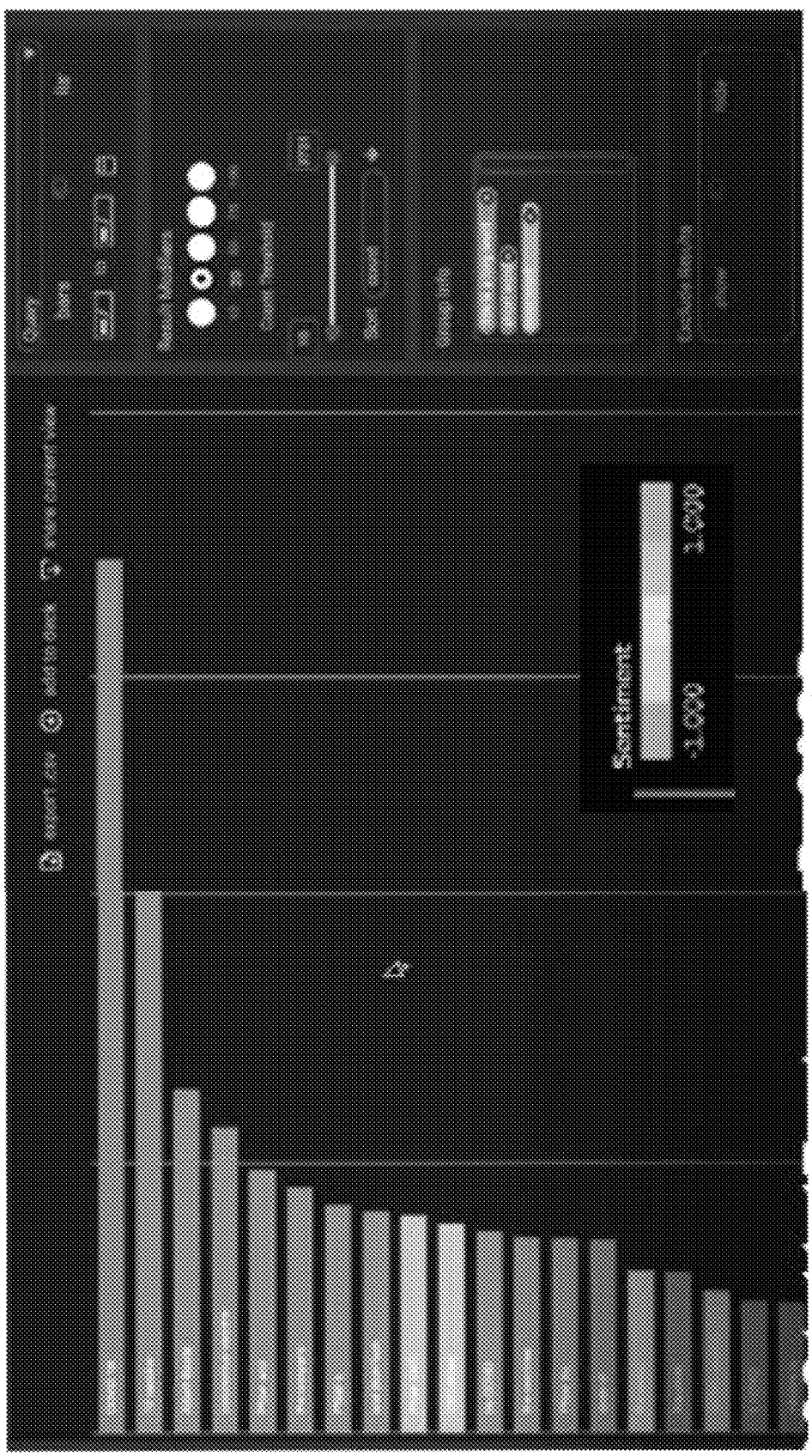
FIG. 23 is a horizontal bar graph displaying sentiment related to a particular party, in accordance with some embodiments of the present disclosure.

FIG. 23 illustrates an NLP display of a horizontal bar graph provided by the system, showing sentiment related to the CEO of PFIZER, Albert Bourla, showing the most commonly used words associated with Bourla in a dataset. As one might expect, those words prominently feature "COVID-19" and "vaccine." The data can be exported, by the system, to a spreadsheet, producing, for instance, six thousand to ten thousand cells long. The system can then sort words, for instance, based on how positive, negative, or often they occur.

Figure 24:
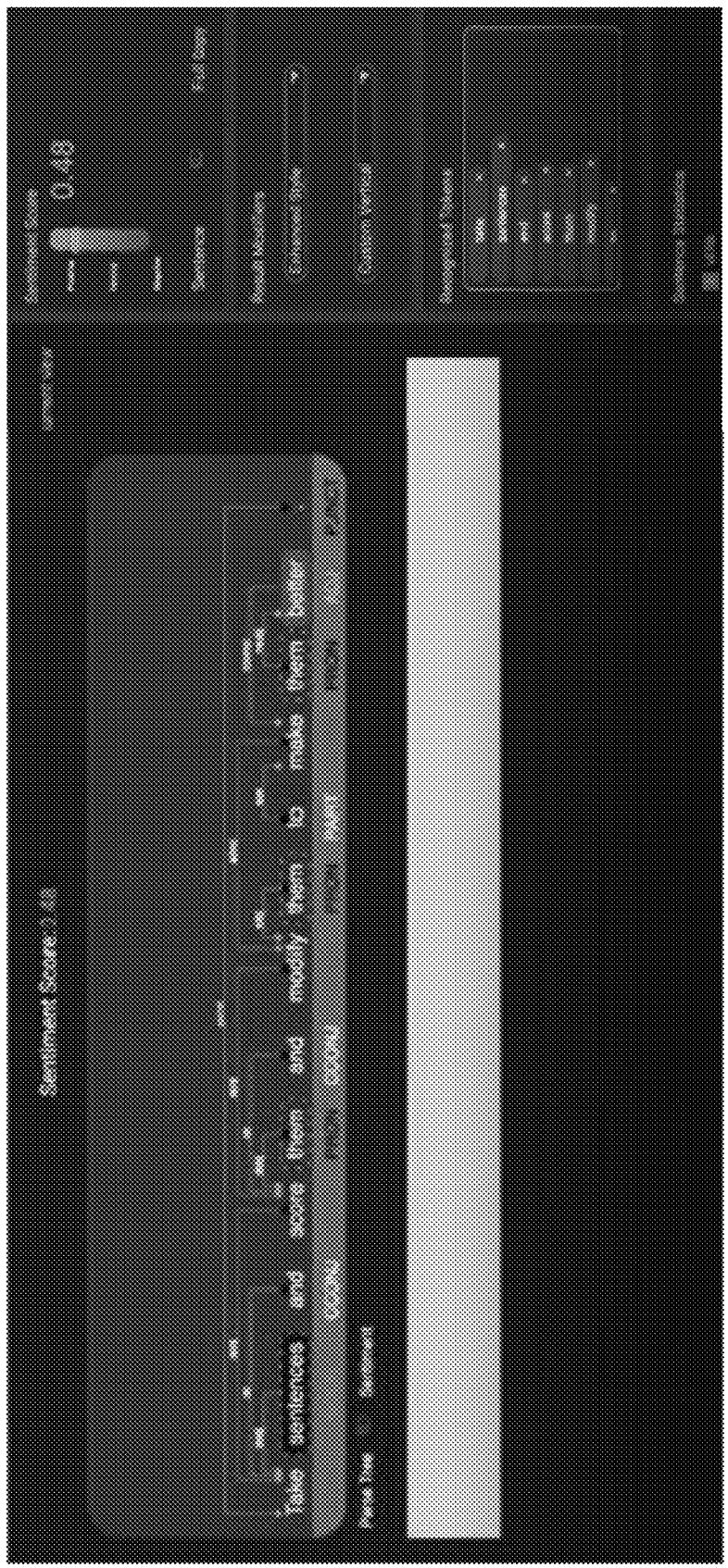
FIG. 24 illustrates a screenshot of a visualizer wherein data can be sorted dynamically, in accordance with some embodiments of the present disclosure.
Figure 25:
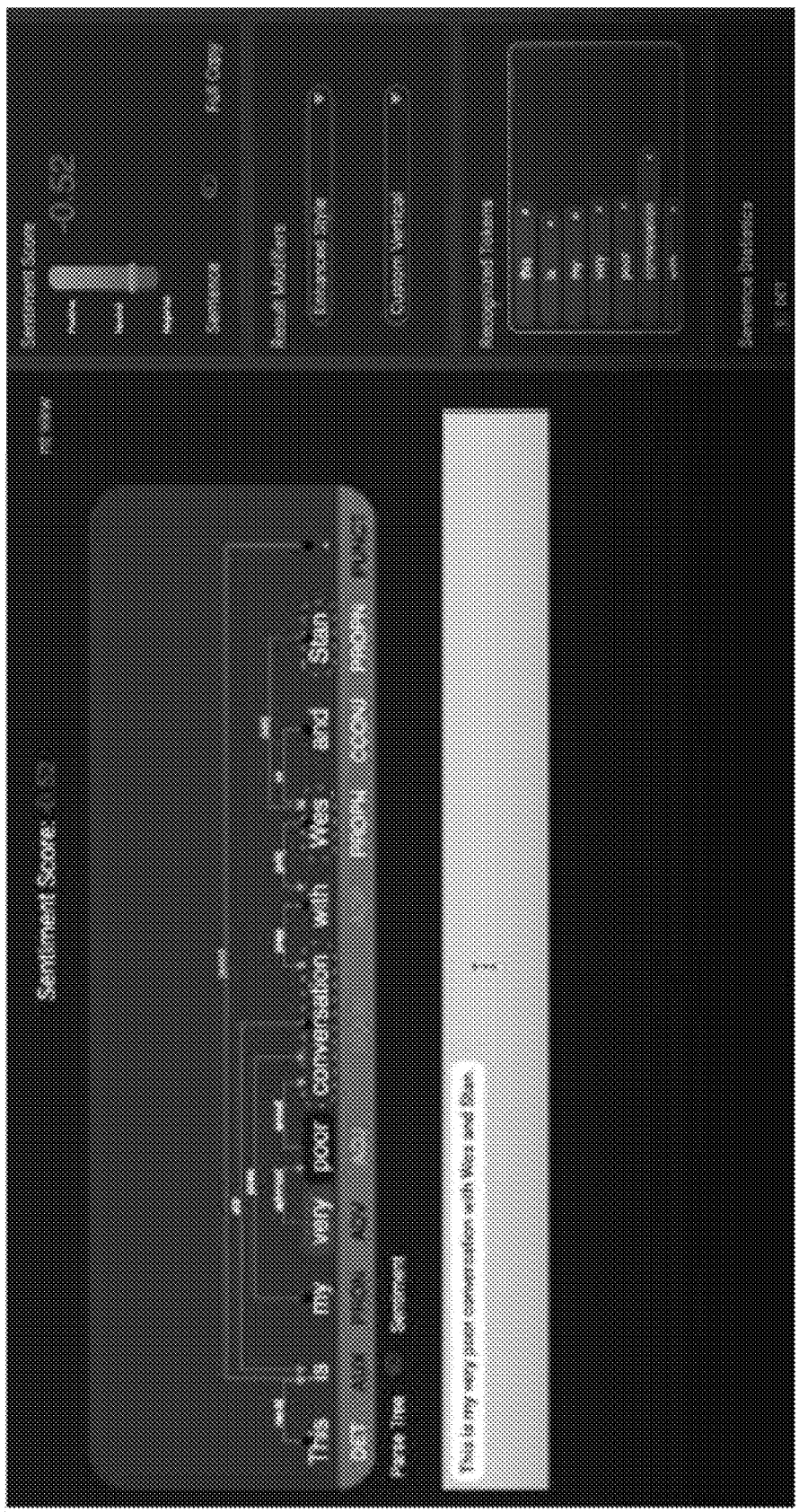
FIG. 25 shows a different screenshot of the visualizer, characterizing a conversation as poor, in accordance with some embodiments of the present disclosure.

FIG. 24 illustrates a screenshot of a sentiment visualizer and analyzer of the system (of the type discussed with respect to FIG. 16), wherein data can be sorted dynamically. For instance, the system can initially score a conversation dynamically based on its characterizations as an excellent conversation. However, as shown in FIG. 25, which shows a different screenshot of the visualizer and analyzer, characterizing the conversation as poor, a different dynamic mapping of words can result from identifying various modifiers of the word "poor" that relate to a poor conversation. Databases can be employed by the system, where dictionary words have been scored. These words were sent to people, in connection with a survey, who, for nominal compensation, scored words and phrases on a scale from negative one (−1) to a positive one (+1). one (+1) being more positive and negative one (−1) being more negative in perception. According to this disclosure, this data type was used to shape the sentiment rankings used with the NLP. Further, sentiment scoring, performed by the system, can be based upon a statistical sampling of the population of sentiment responses from the survey.

The NLP of the system can permit a view of the performance of a language from a lexicon. This can allow a focus on gaining insights into negative narratives, for instance, about a company that may exist. The NLP provides a basis to counteract negative narratives with positive narratives.

Figure 26:
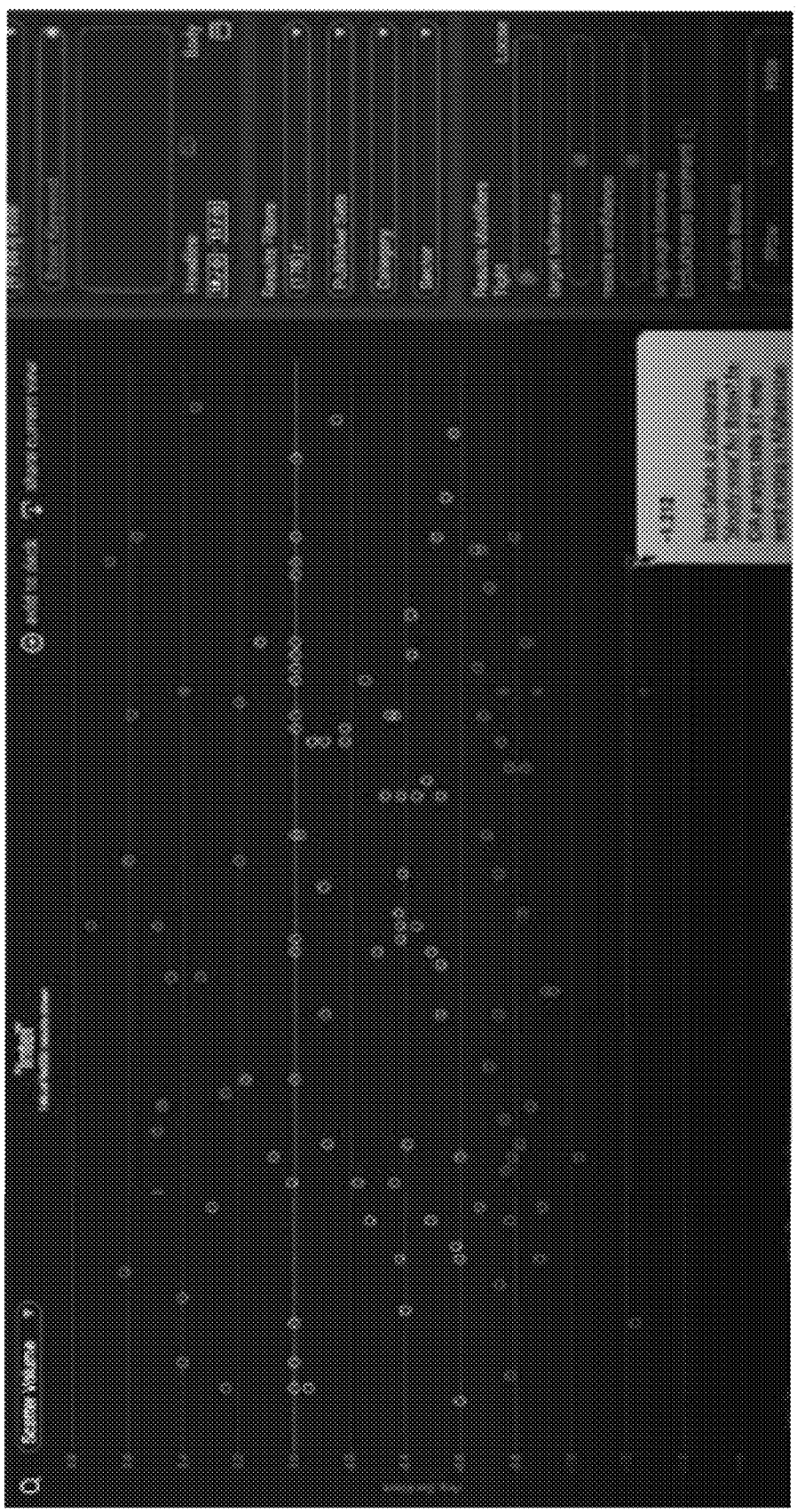
FIG. 26 illustrates a plot of malign actors involved in news coverage, in accordance with some embodiments of the present disclosure.

FIG. 26 illustrates a plot, provided by the system, of malign actors involved in news coverage. This provides a view of propaganda outlets and how they can seek to weaponize language. As shown in FIG. 26, sentiment over time for various news sources is reflected therein. Inflammatory content can be identified, by the system, that can drive a particularly dangerous narrative.

It is to be understood that none of the steps described herein is essential or indispensable. Any steps can be adjusted or modified, and other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are non-limiting. The section headings and subheadings do not represent or limit the full scope of the embodiments described in the sections to which the headings and subheadings pertain. For example, a section titled "Topic 1" may include embodiments that do not pertain to Topic 1, and embodiments described in other sections may apply to and be combined with embodiments described within the "Topic 1" section.

The features and processes described above may be used independently or combined. All possible combinations and sub-combinations are intended to fall within the scope of this disclosure. In addition, certain methods, events, states, or process blocks may be omitted in some implementations. The methods, steps, and processes described herein are also not limited to any particular sequence, and the blocks, steps, or states relating thereto can be performed in appropriate sequences. For example, described tasks or events may be performed in an order other than the order specifically disclosed. Multiple steps may be combined in a single block or state. The example tasks or events may be performed in serial, parallel, or another manner. Tasks or events may be added or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless expressly stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless expressly stated otherwise, is otherwise understood with the context as used in general to convey that an item, term, etc., may be either X, Y, or Z. Thus, such conjunctive language is not generally intended to imply that certain embodiments require at least one of X, at least one of Y, and at least one of Z to each be present.

The term "and/or" means that "and" applies to some embodiments, and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in various other forms; furthermore, various omissions, substitutions, and changes in the form of the methods and systems described herein may be made without departing from the spirit of the inventions disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a predetermined desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that these and similar terms are to be associated with the appropriate physical quantities and are merely convenient labels applied to these quantities. The present disclosure can refer to the action and processes of a computing system or similar electronic computing device that manipulates and transforms data represented as physical (electronic) quantities within the computing system's registers and memories into other data similarly represented as physical quantities within the computing system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as but not limited to, any type of disk, including floppy disks, optical disks, CD-ROMs, magnetic-optical disks, read-only memories (ROMs), random access memories (RAMs), EPROMs, EEPROMs, magnetic or optical cards, or any type of media suitable for storing electronic instructions, each coupled to a computing system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for various systems will appear as outlined in the description below. In addition, the present disclosure is not described with reference to any particular programming language. It will be appreciated that a variety of programming languages can be used to implement the teachings of the disclosure as described herein.

The present disclosure can be provided as a computer program product, or software that can include a machine-readable medium having stored thereon instructions, which can be used to program a computing system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as read-only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made without departing from the broader spirit and scope of embodiments of the disclosure as set forth in the following claims. Accordingly, the specification and drawings are to be regarded in an illustrative rather than a restrictive sense.

What is claimed is:

1. A method, comprising:
   receiving, by a computing system, textual news data via a communications network from a plurality of data sources;
   parsing, by the computing system, the received textual news data;
   generating, by the computing system, a plurality of syntactic dependency trees according to the parsed textual news data;
   determining, by the computing system, a sentiment score for the parsed textual news data corresponding to a word or phrase associated with the parsed textual news data according to the generated plurality of syntactic dependency trees;
   generating, by the computing system, an image comprising the determined sentiment score; and
   displaying, via a graphical user interface (GUI), the determined sentiment score.

2. The method of claim 1, further comprising statistical sampling, by the computing system, the received textual news data, and wherein the determination of sentiment score is further based on statistical sampling of the received textual news data.

3. The method of claim 2, further comprising resolving, by the computing system, syntactic ambiguity in each one of the generated plurality of syntactic dependency trees prior to determining the sentiment score, and wherein the determination of the sentiment score is based on the resolved plurality of syntactic dependency trees.

4. The method of claim 3, further comprising determining, by the computing system, a respective accuracy score for each one of the resolved plurality of syntactic dependency trees,
   wherein assigning an accuracy score to a syntactic dependency tree of the resolved plurality of syntactic dependency trees is based on an estimation of accuracy in resolving syntactic ambiguity in the syntactic dependency tree,
   wherein the assignment of the respective accuracy scores occurs prior to determining the sentiment score, and
   wherein the determination of the sentiment score is further based on the determined accuracy scores for each one of the resolved plurality of syntactic dependency trees.

5. The method of claim 4, wherein the determining of the sentiment score for the parsed textual news data comprises:
   selecting a dependency tree of the resolved plurality of syntactic dependency trees that has the highest determined accuracy score of the determined accuracy scores; and
   determining the sentiment score according to the selected dependency tree having the highest determined accuracy score.

6. The method of claim 5,
   wherein the method is part of an application framework, wherein the application framework provides searchable content to be searched via the GUI, and wherein the method further comprises deriving the searchable content from the parsed textual news data.

7. The method of claim 6, further comprising providing, via the GUI, search functions using the generated plurality of syntactic dependency trees, the determined sentiment score, the determined accuracy scores, or a combination thereof as a basis for queries.

8. The method of claim 7, wherein the search functions are part of a user search and audit tool interface provided by the GUI, and wherein the search functions further comprise queries that are definable by a user identifier, a date, positive sentiment, negative sentiment, news attribution, or any combination thereof.

9. The method of claim 1, wherein the method is part of an application framework, wherein the application framework provides searchable content to be searched via the GUI and search functions, and wherein the method further comprises deriving the searchable content from the parsed textual news data.

10. The method of claim 9, wherein the search functions are part of a user search and audit tool interface provided by the GUI, and wherein the search functions further comprise queries that are definable by a user identifier, a date, positive sentiment, negative sentiment, news attribution, or any combination thereof.

11. The method of claim 1, wherein the plurality of data sources comprise application programming interfaces, really simple syndication (RSS) feeds, social media platforms, news aggregators, social news aggregators, or any combination thereof.

12. The method of claim 1, further comprising:

identifying, by the computing system, sentiment of or related to at least a part of the received textual news data based on a source of the at least part of the received textual news data; and displaying, via the GUI, the sentiment based on the source of the at least part of the received textual news data.

13. The method of claim 1, further comprising:

identifying, by the computing system, sentiment of or related to at least a part of the received textual news data based on a date of publication of the at least part of the received textual news data; and displaying, via the GUI, the sentiment based on the date of publication of the at least part of the received textual news data.

14. A method, comprising:

receiving, by a computing system, textual news data via a communications network from a plurality of data sources;

constructing, by the computing system, a message comprising the received textual news data;

parsing, by the computing system, the constructed message;

generating, by the computing system, a plurality of syntactic dependency trees according to the parsed message;

determining, by the computing system, a sentiment score for the parsed message corresponding to a word or phrase associated with the parsed message according to the generated plurality of syntactic dependency trees;

generating, by the computing system, an image comprising the determined sentiment score; and displaying, via a graphical user interface (GUI), the determined sentiment score.

15. The method of claim 14, further comprising resolving, by the computing system, syntactic ambiguity in each one of the generated plurality of syntactic dependency trees prior to determining the sentiment score, and wherein the determination of the sentiment score is based on the resolved plurality of syntactic dependency trees.

16. The method of claim 15, further comprising determining, by the computing system, a respective accuracy score for each one of the resolved plurality of syntactic dependency trees, wherein assigning an accuracy score to a syntactic dependency tree of the resolved plurality of syntactic dependency trees is based on an estimation of accuracy in resolving syntactic ambiguity in the syntactic dependency tree, wherein the assignment of the respective accuracy scores occurs prior to determining the sentiment score, and wherein the determination of the sentiment score is further based on the determined accuracy scores for each one of the resolved plurality of syntactic dependency trees.

17. The method of claim 16, wherein the determining of the sentiment score for the parsed message comprises:

selecting a dependency tree of the resolved plurality of syntactic dependency trees that has the highest determined accuracy score of the determined accuracy scores; and determining the sentiment score according to the selected dependency tree having the highest determined accuracy score.

18. The method of claim 17, further comprising:

iteratively changing, by the computing system, the constructed message to produce a new message; and determining a corresponding sentiment score for the new message until a target sentiment score is reached.

19. A non-transitory computer-readable storage medium tangibly encoded with computer-executable instructions, that, when executed by a processor of a computing device the processor performs a method comprising the following operations:

receiving textual news data via a communications network from a plurality of data sources;

constructing a message comprising the received textual news data;

parsing the constructed message;

generating a plurality of syntactic dependency trees according to the parsed message;

determining a sentiment score for the parsed message corresponding to a word or phrase associated with the parsed message according to the generated plurality of syntactic dependency trees;

generating an image comprising the determined sentiment score; and displaying, via a graphical user interface (GUI), the determined sentiment score.

20. The non-transitory computer-readable storage medium of claim 19, wherein the method further comprises the following operations: resolving syntactic ambiguity in each one of the generated plurality of syntactic dependency trees prior to determining the sentiment score, and wherein the determination of the sentiment score is based on the resolved plurality of syntactic dependency trees.

* * * * *